(12) United States Patent
Hirose et al.

(10) Patent No.: US 10,148,585 B2
(45) Date of Patent: Dec. 4, 2018

(54) COMMUNICATION CONTROL METHOD, INFORMATION PROCESSING APPARATUS, AND STORAGE MEDIUM

(71) Applicant: FUJITSU LIMITED, Kawasaki-shi, Kanagawa (JP)

(72) Inventors: Atsuhito Hirose, Odawara (JP); Toshihiro Kawakami, Yokohama (JP); Tamaki Tanaka, Numazu (JP); Toshiaki Yamada, Mishima (JP); Koichi Miura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 655 days.

(21) Appl. No.: 14/719,881

(22) Filed: May 22, 2015

(65) Prior Publication Data

US 2016/0006660 A1 Jan. 7, 2016

(30) Foreign Application Priority Data

Jul. 7, 2014 (JP) .................................. 2014-139437

(51) Int. Cl.
*H04L 12/863* (2013.01)
(52) U.S. Cl.
CPC .................................. *H04L 47/623* (2013.01)
(58) Field of Classification Search
CPC .................................................. H04L 47/623
USPC ........................................................ 370/235
See application file for complete search history.

(56) References Cited

U.S. PATENT DOCUMENTS

| | | | | |
|---|---|---|---|---|
| 5,974,465 A | * | 10/1999 | Wong | H04L 29/06 370/230 |
| 6,185,208 B1 | * | 2/2001 | Liao | H04L 67/02 370/392 |
| 7,724,750 B2 | * | 5/2010 | Swami | H04L 47/10 370/395.42 |
| 2005/0228962 A1 | * | 10/2005 | Takase | G06F 12/0246 711/168 |

FOREIGN PATENT DOCUMENTS

| | | |
|---|---|---|
| JP | 5-160855 | 6/1993 |
| JP | 2006-31238 | 2/2006 |

* cited by examiner

*Primary Examiner* — Natasha W Cosme
(74) *Attorney, Agent, or Firm* — Oblon, McClelland, Maier & Neustadt, L.L.P.

(57) ABSTRACT

A communication control method includes: comparing the number of messages to be transmitted which are stored in a buffer with the number of communication processings in execution, each of the communication processings being to execute processing to transmit the messages stored in the buffer; and determining, by a processor, whether integration processing is performed on a newly generated first message to be transmitted based on a result of the comparing, the integration processing being processing that integrates the first message and a message which is in the buffer and of which the destination as a destination of the first message is specified.

18 Claims, 47 Drawing Sheets

FIG. 2

| DESTINATION | LAST NUMBER | FREE SPACE |
|---|---|---|
| A | 3 | 0 |
| B | 5 | 600 BYTES |

FIG. 5

| DESTINATION | LAST NUMBER | FREE SPACE |
|---|---|---|
| A | 1 | 500 |
| B | 2 | 550 |

FIG. 10

| PARAMETER | VALUE |
|---|---|
| ExecutionControlMultiplicity | 4 |
| CommunicationControlMultiplicity | 4 |
| ServerTimeOut | 3 |
| MaxBufferMessages | 100 |
| MaxClientID | 1000 |
| MessageBufferSize | 1500 |

FIG. 11

| PARAMETER | VALUE |
|---|---|
| ClientTimeOut | 3 |
| ClientID | CL001 |
| ServerName | 101.23.11.501 |
| ServerPort | 80 |
| ClientPort | 80 |

FIG. 13

| ITEM | VALUE |
|---|---|
| NUMBER OF THREADS FOR DATA PROCESSING | 4 |
| NUMBER OF THREADS FOR COMMUNICATION PROCESSING | 4 |
| MAXIMUM NUMBER OF BUFFERS | 100 |
| SERVER TIME-OUT | 3 |
| BUFFER SIZE | 1500 |
| PROCESS STOP FLAG | OFF |

FIG. 14

| ITEM | VALUE |
|---|---|
| SEMAPHORE FOR RECEPTION PROCESSING | LOCK |
| SEMAPHORE FOR DATA PROCESSING | UNLOCK |
| SEMAPHORE FOR TRANSMISSION PROCESSING | UNLOCK |

FIG. 17

| ITEM | VALUE |
|---|---|
| CONTROL DATA | |
| SERVER IP ADDRESS | 101.23.11.501 |
| SERVER PORT NUMBER | 80 |
| CLIENT ID | CL001 |
| REQUEST NUMBER | 000000001 |
| CLIENT IP ADDRESS | 101.23.11.501 |
| CLIENT PORT NUMBER | 80 |
| CLIENT PROCESS ID | 4438 |
| CLIENT THREAD ID | 47470217350064 |
| SESSION ID | 102367598 |
| PROCESSING REQUEST TRANSMISSION TIME | 2013.8.19 15:32:32.225 |
| REQUEST BODY | |
| PROCESSING TYPE | SELECT |
| PROCESSING REQUEST TARGET | TABLE1 |
| INPUT INFORMATION | WHERE COLUMN2=5 |
| OUTPUT INFORMATION | COLUMN1 |

FIG. 18

| ITEM | VALUE |
|---|---|
| EXCLUSION INFORMATION | 0 |
| REQUEST NUMTER | 10 |
| RESERVATION NUMBER | 10 |
| EXECUTION NUMBER | 10 |
| COMPLETED EXECUTION NUMBER | 10 |

FIG. 21

| ITEM | | VALUE |
|---|---|---|
| EXCLUSION INFORMATION | 1 | 0 |
| | ⋮ | ⋮ |
| | N | 1 |
| RECEPTION TIME | 1 | 2014042522103110 |
| | ⋮ | ⋮ |
| | N | 2014042522091501 |
| RESULT CODE | 1 | 0 |
| | ⋮ | ⋮ |
| | N | 0 |
| CLIENT ID | 1 | CL001 |
| | ⋮ | ⋮ |
| | N | CL00N |
| BUFFER | 1 | PROCESSING REQUEST |
| | ⋮ | ⋮ |
| | N | PROCESSING REQUEST |

FIG. 27

| ITEM | | VALUE |
|---|---|---|
| EXCLUSION INFORMATION | | 1 |
| COMPLETED TRANSMISSION NUMBER | | 8 |
| RESULT NUMBER | | 8 |
| RESERVATION NUMBER | | 9 |
| DESTINATION A | CLIENT ID | CL001 |
| | LAST NUMBER | 4 |
| | FREE SPACE SIZE | 256 |
| DESTINATION B | CLIENT ID | CL002 |
| | LAST NUMBER | 2 |
| | FREE SPACE SIZE | 0 |
| DESTINATION C | CLIENT ID | CL003 |
| | LAST NUMBER | 1 |
| | FREE SPACE SIZE | 128 |
| ⋮ | | ⋮ |

FIG. 33

| ITEM | | VALUE |
|---|---|---|
| EXCLUSION INFORMATION | 1 | 0 |
| | ⋮ | ⋮ |
| | N | 1 |
| RECEPTION TIME | 1 | 2014042522103110 |
| | ⋮ | ⋮ |
| | N | 2014042522091501 |
| RESULT CODE | 1 | 0 |
| | ⋮ | ⋮ |
| | N | 0 |
| CLIENT ID | 1 | CL001 |
| | ⋮ | ⋮ |
| | N | CL00N |
| BUFFER | 1 | PROCESSING REQUEST |
| | ⋮ | ⋮ |
| | N | PROCESSING REQUEST |

FIG. 41

| ITEM | VALUE |
|---|---|
| COMMON CONTROL DATA | |
|     CLIENT IP ADDRESS | 101.23.11.501 |
|     CLIENT PORT NUMBER | 80 |
|     CLIENT ID | CL001 |
|     CLIENT IP ADDRESS | 101.23.11.501 |
|     PROCESSING RESULT NUMBER | 2 |
| PROCESSING RESULT 1 | |
|   CONTROL DATA | |
|     RESULT NUMBER | 1 |
|     REQUEST NUMBER | 000000001 |
|     CLIENT PROCESS ID | 4438 |
|     CLIENT THREAD ID | 47470217350064 |
|     SESSION ID | 102367598 |
|     PROCESSING REQUEST TRANSMISSION TIME | 2013.8.19 15:32:32.225 |
|     PROCESSING RESULT TRANSMISSION TIME | 2013.8.19 15:32:32.236 |
|     STATE | 0 |
|   RESULT BODY | |
|     RESULT BODY SIZE | 4 |
|     SESSION ID | COLUMN=4 |
| PROCESSING RESULT 2 | |
|   CONTROL DATA | |
|     RESULT NUMBER | 2 |
|     ⋮ | ⋮ |
|   RESULT BODY | |
|     ⋮ | ⋮ |

FIG. 44

| ITEM | VALUE |
|---|---|
| CLIENT ID | CL003 |
| SERVER IP ADDRESS | 101.23.11.501 |
| SERVER PORT NUMBER | 80 |
| CLIENT TIMEOUT | 5 |
| CLIENT IP ADDRESS | 172.20.48.1 |
| CLIENT PORT NUMBER | 80 |

FIG. 45

| ITEM | VALUE |
|---|---|
| EXCLUSION INFORMATION | 0 |
| REQUEST NUMTER | 15 |

COMMUNICATION CONTROL METHOD, INFORMATION PROCESSING APPARATUS, AND STORAGE MEDIUM

CROSS-REFERENCE TO RELATED APPLICATION

This application is based upon and claims the benefit of priority of the prior Japanese Patent Application No. 2014-139437, filed on Jul. 7, 2014, the entire contents of which are incorporated herein by reference.

FIELD

The embodiments discussed herein are related to a communication control technique.

BACKGROUND

A mission critical online system is constructed not only to be provided with reliability and availability, which are important to stable operation of the system, but also to have a response time reduced as much as possible. The response time is from transmission of a processing request by a user device to reception of a processing result. Such a system is an online system, for example, for stock trading or foreign exchange margin trading. Also, in order to cope with the situation in which trading is often concentrated in a particular period, such a system is constructed to have sufficient throughput which allows a great number of processing requests to be processed simultaneously in parallel.

Regarding the processing performed by a server, the following techniques are known. For example, a server performs processing based on received processing requests, and classifies messages, which are processing results, into queues that are prepared for each destination. When the number of messages stored in a queue becomes greater than or equal to a predetermined number, the server integrates the plurality of messages stored in the queue and transmits the messages to a transmission source apparatus of processing requests. Alternatively, when a predetermined time elapses since a message is stored in a queue, the server integrates messages stored in the queue and transmits the integrated messages to a transmission source apparatus of processing requests. In this manner, messages having the same destination are collectively transmitted, and thus the amount of traffic in the network may be reduced and the processing load of the server may be decreased.

Although such a technique can reduce the number of times of transmission, the response time may be increased. For example, when the number of processing requests received by a server is relatively small, processing results are not likely to be accumulated in a queue. Therefore, although the processing load of the server is relatively low, the processing results stored in a queue may not be transmitted until a predetermined time elapses. Also when the destinations of processing results are evenly distributed, processing results are not likely to be accumulated in a queue. That is, the above-described technique may reduce response performance by integrating the processing results.

Related arts are disclosed in, for example, Japanese Laid-open Patent Publication Nos. 2006-31238 and 5-160855.

SUMMARY

According to an aspect of the invention, a communication control method includes: comparing the number of messages to be transmitted which are stored in a buffer with the number of communication processings in execution, each of the communication processings being to execute processing to transmit the messages stored in the buffer; and determining, by a processor, whether integration processing is performed on a newly generated first message to be transmitted based on a result of the comparing, the integration processing being processing that integrates the first message and a message which is in the buffer and of which the destination as a destination of the first message is specified.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1, 2, 3, 4, 5, and 6 are diagrams for illustrating the overview of the present embodiment;

FIG. 10 illustrates an example data stored in a definition file storage unit of the server;

FIG. 11 illustrates an example data stored in a definition file storage unit of the client apparatus;

FIG. 13 illustrates an example management table of the server;

FIG. 14 illustrates an example semaphore generated;

FIG. 17 illustrates an example processing request;

FIG. 18 illustrates an example data stored in a request management table of the server;

FIG. 21 illustrates an example data stored in a processing request storage unit;

FIG. 27 illustrates an example data stored in a result management table;

FIG. 33 illustrates an example data stored in a processing result storage unit;

FIG. 41 illustrates an example processing result;

FIG. 44 illustrates an example data stored in a management table of the client apparatus;

FIG. 45 illustrates an example data stored in the request management table of the client apparatus;

DESCRIPTION OF EMBODIMENTS

An aspect of the present application provides a technique for avoiding deterioration of response performance due to integration processing of processing results.

The scheme of the present embodiment will be described with reference to FIGS. 1, 2, 3, 4, 5, and 6.

Figure 1:
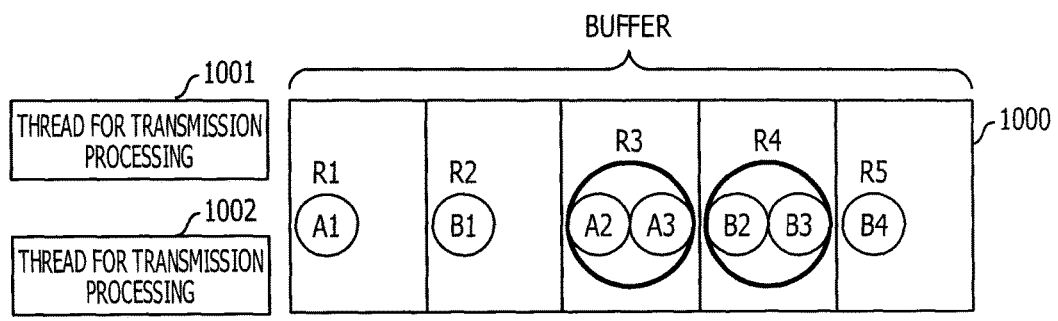

For example, the situation as illustrated in FIG. 1 is discussed. In FIG. 1, a server has a buffer 1000, and threads 1001 and 1002 for transmission processing are executed in the server. The threads 1001 and 1002 for transmission processing retrieve a processing result from the buffer 1000 and transmits the processing result. Each of circular figures depicted with a solid line indicates a processing result, and a character string inside a circle indicates a destination and a number of the processing result to be transmitted to the destination. For example, processing result R1 is the first processing result transmitted to destination A, and is the first processing result of all processing results. The circular figure depicted by a thick line indicates that a plurality of processing results is integrated to a single processing result. For example, processing result R4 includes the second processing result and the third processing result to be transmitted to destination B, and the processing result R4 is the fourth processing result of all. The buffer 1000 is divided into five regions. In FIG. 1, as a region is closer to the left, a processing result in the region is transmitted earlier.

In the present embodiment, processing results are identified that are subject to processing (hereinafter referred to as integration processing) to integrate a plurality of processing results having the same destination based on a result of comparison between the number X of processing results and the number Y of threads for transmission processing. For example, in FIG. 1, the number Y of threads for transmission processing is 2. The plurality of integrated processing results is counted as one processing result. Therefore, in FIG. 1, the number X of processing results is 5. When the number of processing results is greater than the number of threads for transmission processing like this, the (Y+1)th and subsequent processing results are subject to the integration processing and other processing results are excluded from being subject to the integration processing. In FIG. 1, processing result R3, R4, and R5 are subject to the integration processing, and processing results R1 and R2 are excluded from being subject to the integration processing. In this manner, a processing result is not likely to be on standby for transmission due to the integration processing performed on processing results.

Also, in the present embodiment, data as illustrated in FIG. 2 is managed separately from the buffer 1000. In FIG. 2, the identification information on a destination, the last number, and free space size are managed. The last number is the greatest number among the numbers of the processing results for a certain destination. For example, in the example of FIG. 1, the number of the processing result R3 is the greatest among the processing results (processing results R1 and R3) for the destination A, and thus the last number is 3. The free space size is the free space size of a region that stores the processing result with the last number. For example, in the example of FIG. 1, the free space size of the region that stores the processing result R3 is 0. In the present embodiment, among the (Y+1)th and subsequent processing results, the processing result with the last number is subject to the integration processing. Accordingly, the buffer 1000 may not be checked to search for a free space, and it is possible to reduce standby of the threads 1001 and 1002 for transmission processing for acquiring exclusive access to the buffer 1000.

Figure 3:
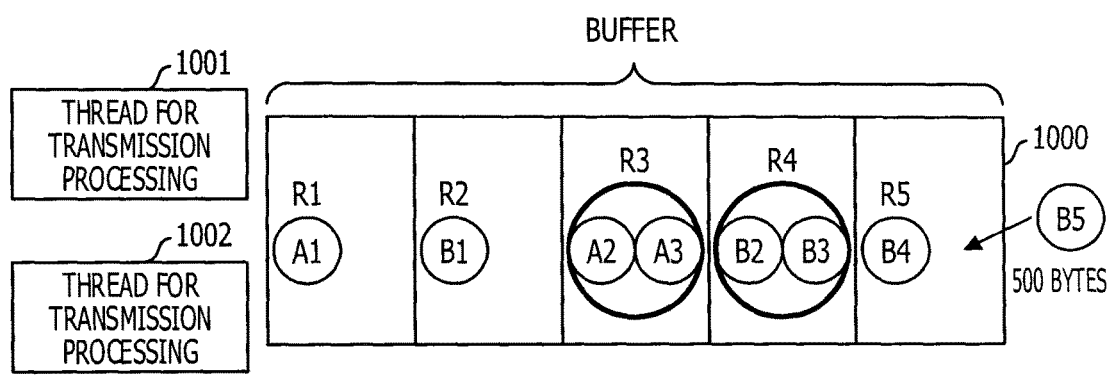

For example, it is assumed that a processing result is newly generated as illustrated in FIG. 3. The newly generated processing result has the destination B and has a size of 500 bytes. In the present embodiment, even when the region, which stores the processing result R2, has a sufficient free space, the processing result R2 is not subject to the integration processing, and thus is not integrated with the newly generated processing result. Because the processing result with the last number is subject to the integration processing, the processing result R4 is not subject to the integration processing, either. In this example, the data illustrated in FIG. 2 indicates that the region, which stores the processing result R5, has a free space size of 600 bytes, and thus the newly generated processing result and the processing result R5 are integrated.

Figure 4:
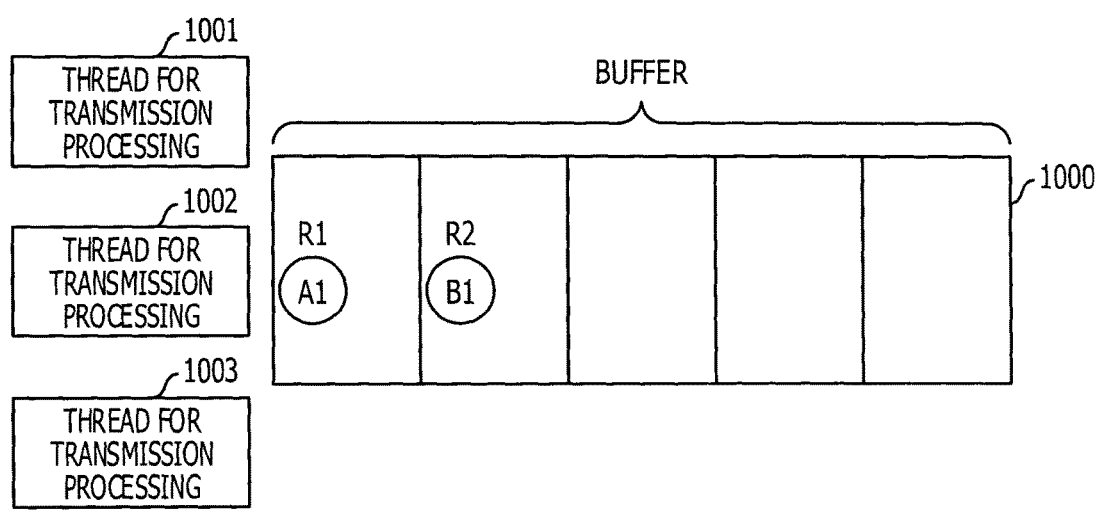

Next, the situation as illustrated in FIG. 4 is discussed. In FIG. 4, threads 1001 to 1003 for transmission processing are performed, and thus the number Y of threads for transmission processing is 3. The buffer 1000 stores processing result R1 and processing result R2. The processing result R1 is the first processing result to be transmitted to the destination A. The processing result R2 is the first processing result to be transmitted to the destination B. Therefore, the number X of processing results is 2. When the number Y of threads for transmission processing is greater than or equal to the number X of processing results like this, there is possibility that a processing result is on standby for transmission due to the integration processing performed on processing results. Therefore, when the number of threads for transmission processing is greater than or equal to the number of processing results, the integration processing is not performed. In the example of FIG. 4, the processing results R1 and R2 are excluded from being subject to the integration processing.

In the situation illustrated in FIG. 4, the server manages data as illustrated in FIG. 5 separately from the buffer 1000. In FIG. 5, the region, which stores the processing result R1 for the destination A, has a free space size of 500 bytes and the region, which stores the processing result R2 for the destination B, has a free space size of 550 bytes.

Figure 6:
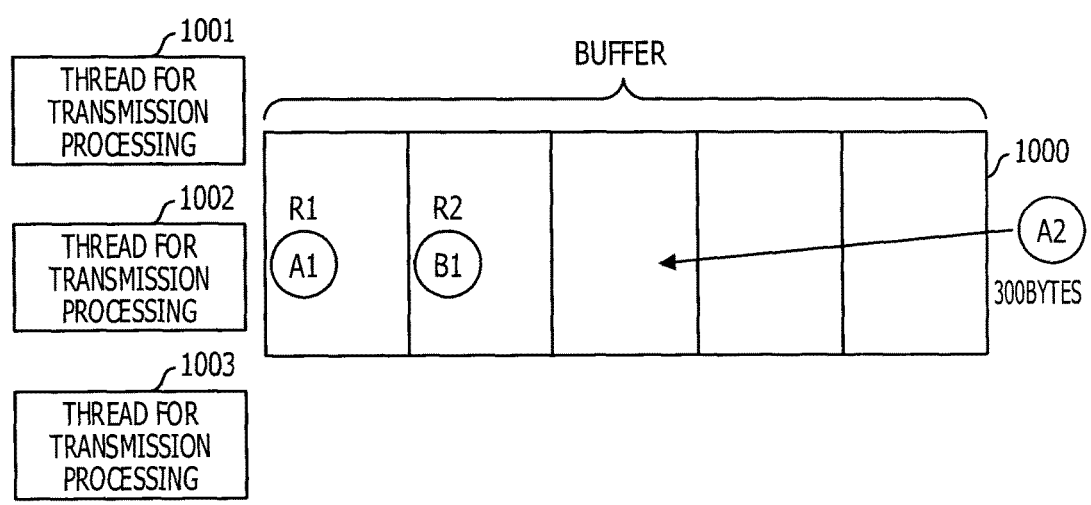

For example, it is assumed that a processing result is newly generated as illustrated in FIG. 6. The newly generated processing result has the destination A and has a size of 300 bytes. In this case, the newly generated processing result is not integrated with the processing result R1 even though the region, which stores the processing result R1, has a free space size of 500 bytes. The newly generated processing result is stored in a region other than the regions that store the processing results R1 and R2. In this manner, it is possible to avoid a delay in timing for transmitting the processing result R1, the delay being due to the integration processing performed on a processing result for the destination A.

As described above, the number of transmission processing may be reduced by performing the integration processing, and thus it is possible to reduce the amount of traffic in the network as well as the processing load of the server. On the other hand, the integration processing is not performed when it is not preferable to perform the integration processing, and thus deterioration of response performance due to the integration processing may be avoided.

The present embodiment will be more specifically described in the following.

Figure 7:
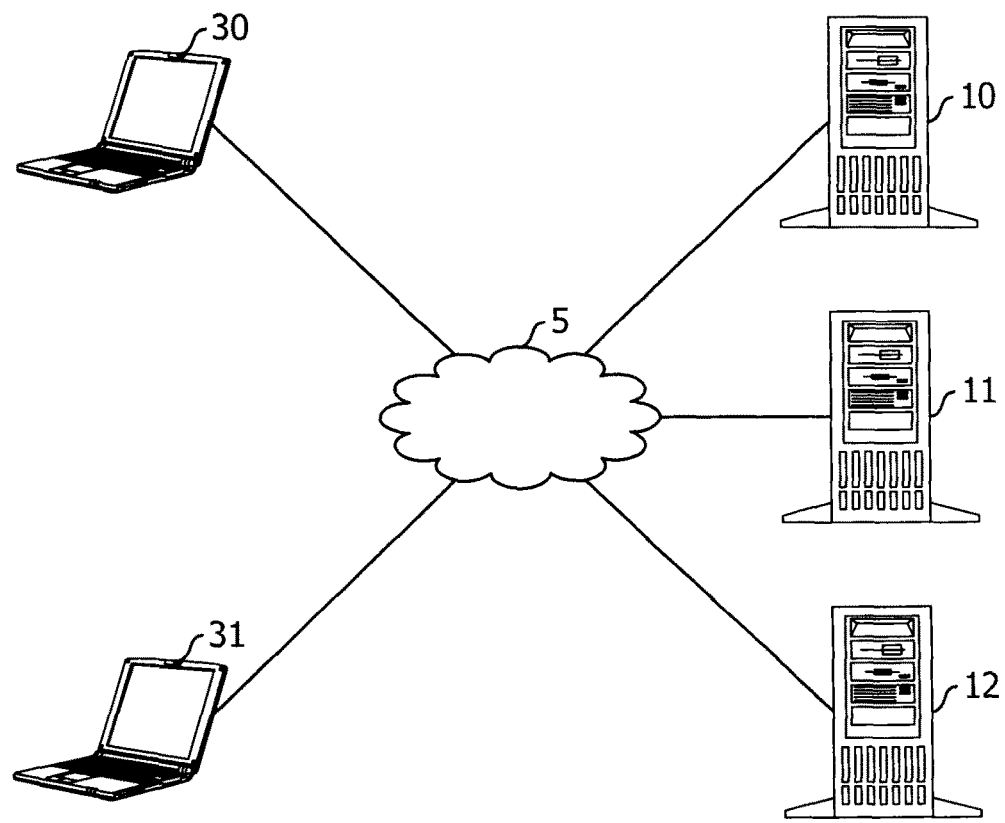
FIG. 7 illustrates a system overview of the present embodiment.

FIG. 7 illustrates a system overview of the present embodiment. A network 5 is coupled to client apparatuses 30 and 31 that each transmit a processing request and to servers 10 to 12 that each perform data processing based on a received processing request. The network 5 is the Internet, for example. A processing request transmitted from one of the client apparatuses 30 and 31 is relayed to one of the servers 10 to 12 via a relay apparatus (not illustrated) installed in the network 5. The server, which has performed data processing based on the received processing request, sends back a processing result of the data processing to the client apparatus that is the transmission source of the processing request.

Figure 8:
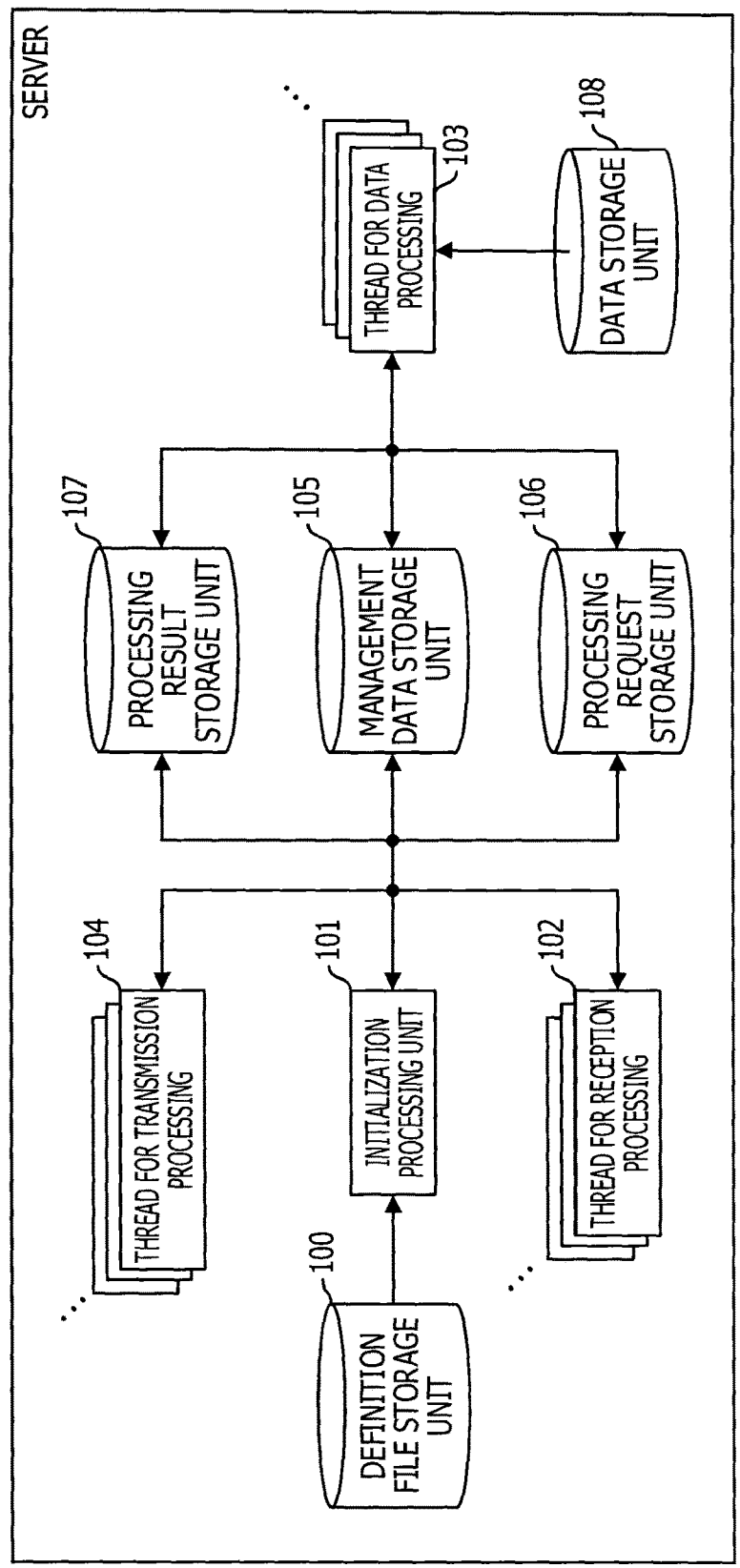
FIG. 8 is a functional block diagram of a server.

FIG. 8 is a functional block diagram of the server 10. The server 10 has a definition file storage unit 100, a management data storage unit 105, a processing request storage unit 106, a processing result storage unit 107, and a data storage unit 108. In the server 10, an initialization processing unit 101, threads 102 for reception processing, threads 103 for data processing, and threads 104 for transmission processing are executed. In FIG. 8, the number of threads 102 for reception processing, the number of threads 103 for data processing, and the number of threads 104 for transmission processing are plural. However, each number may be singular. Also, the threads 102 for reception processing, the threads 103 for data processing, and the threads for transmission processing may be processes instead of threads. Because the servers 11 and 12 each have the same functional block as the server 10, a description thereof is omitted.

The initialization processing unit 101 performs initialization processing based on the data stored in the definition file storage unit 100. Each thread 102 for reception processing receives a processing request from one of the client apparatuses 30 and 31, and stores the processing request in the processing request storage unit 106. In addition, the thread 102 for reception processing updates data stored in the management data storage unit 105. Each thread 103 for data processing performs data processing on data stored in the data storage unit 108 based on the processing request stored in the processing request storage unit 106, and stores a processing result in the processing result storage unit 107. In addition, the thread 103 for data processing updates data stored in the management data storage unit 105. Each thread 104 for transmission processing retrieves a processing result stored in the processing result storage unit 107, and transmits the processing result to the client apparatus that is the transmission source of the processing request corresponding to the processing result. In addition, the thread 104 for transmission processing updates the data stored in the management data storage unit 105.

Figure 9:
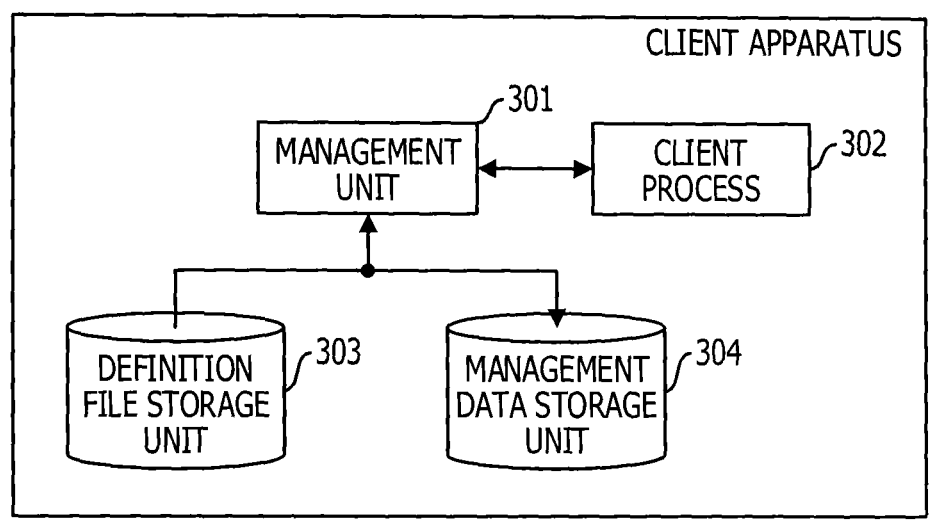
FIG. 9 is a functional block diagram of a client apparatus.

FIG. 9 is a functional block diagram of the client apparatus 30. The client apparatus 30 has a definition file storage unit 303 and a management data storage unit 304. In the client apparatus 30, a management unit 301 and a client process 302 are performed. The client process 302 is, for example, a process of an application program. Because the client apparatus 31 has the same functional block as the client apparatus 30, a description thereof is omitted.

The client process 302 generates a request body, and outputs the request body to the management unit 301. The request body is data that requests data processing. The management unit 301 generates a processing request including the request body received from the client process 302, and transmits the processing request to the servers 10 to 12. The management unit 301 retrieves a result body from a processing result received from the servers 10 to 12, and outputs the result body to the client process 302. The management unit 301 performs initialization processing based on the data stored in the definition file storage unit 303. The management unit 301 updates the data stored in the management data storage unit 304.

FIG. 10 illustrates an example data stored in the definition file storage unit 100 of the server 10. In the example of FIG. 10, the values of the parameters used for processing of the server 10 are stored. The parameter (ExecutionControlMultiplicity) in the first row in FIG. 10 is a parameter that specifies the number of threads 102 for reception processing and the number of threads 104 for transmission processing. The parameter (CommunicationControlMultiplicity) in the second row is a parameter that specifies the number of threads 103 for data processing. The parameter (ServerTimeOut) in the third row is a parameter that specifies the upper limit of time from receiving a processing request to sending back a processing result. The unit of time is, for example, second. The parameter (MaxBufferMessages) in the fourth row is a parameter that specifies the number of buffers provided in the processing request storage unit 106 and the number of buffers provided in the processing result storage unit 107. The parameter (MaxClientID) in the fifth row is a parameter that specifies the maximum of the number of client IDs that are registerable. The parameter (MessageBufferSize) in the sixth row is a parameter that specifies the size of each buffer in the processing request storage unit 106 and the size of each buffer in the processing result storage unit 107. The unit of size is, for example, byte. It is to be noted that the number of threads 104 for transmission processing may not be the same as the number of threads 102 for reception processing.

FIG. 11 illustrates an example data stored in the definition file storage unit 303 of the client apparatus 30. In the example of FIG. 11, the values of the parameters used for processing of the client apparatus 30 are stored. The parameter (ClientTimeOut) in the first row in FIG. 11 is a parameter that specifies the upper limit of time from transmitting a processing request to receiving a processing result. The parameter (ClientID) in the second row is a parameter that specifies the client ID of the client apparatus 30. The parameter (ServerName) in the third row is a parameter that specifies the identification information (for example, the name or IP address) of the server at a transmission destination. The parameter (ServerPort) in the fourth row is a parameter that specifies the port number of a server at the transmission destination. The parameter (ClientPort) in the fifth row is the port number that is used in the client apparatus 30.

Next, the processing performed by the server 10 will be described with reference to FIGS. 12 to 42. First, the initialization processing performed by the initialization processing unit 101 will be described with reference to FIGS. 12 to 15. It is to be noted that at the start time of the initialization processing, the thread 102 for reception processes, the thread 103 for data processing, and the thread 104 for transmission processing are not generated.

Figure 12:
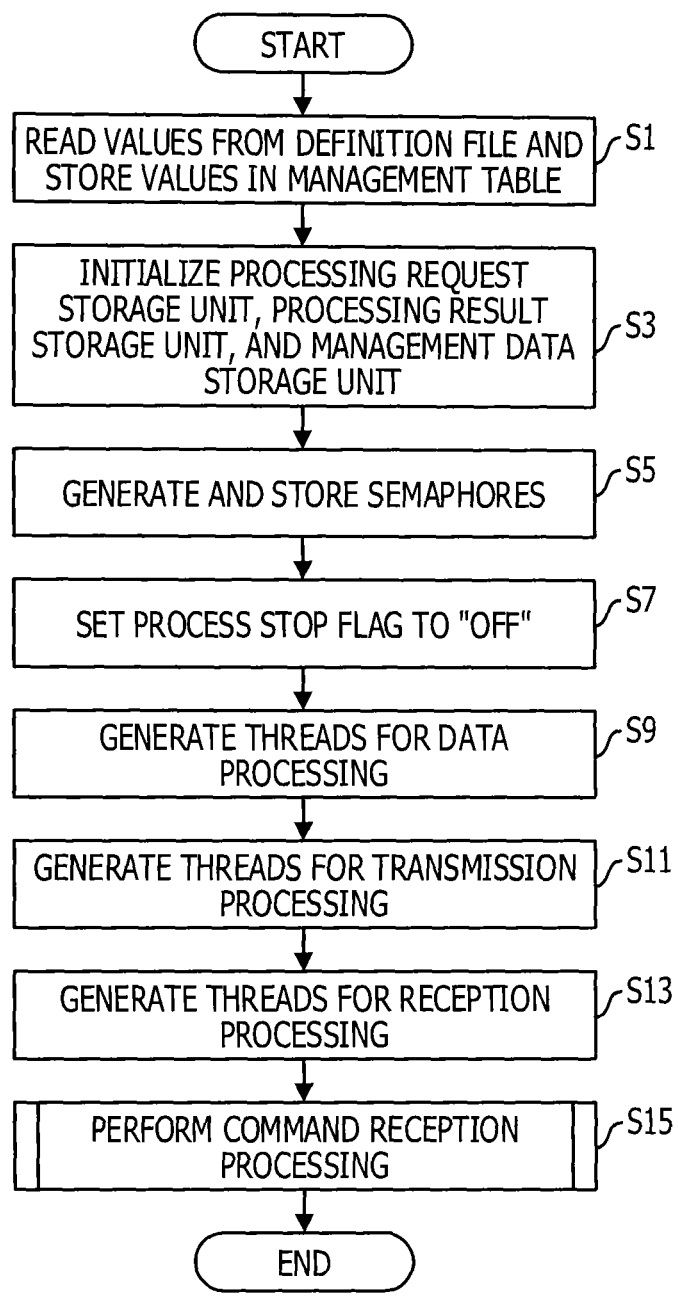
FIG. 12 illustrates a processing flow of initialization processing.

The initialization processing unit 101 of the server 10 reads the values of parameters from the definition file storage unit 100, and stores the values of parameters in a management table stored in the management data storage unit 105 (step S1 in FIG. 12).

FIG. 13 illustrates an example management table of the server 10. In the example of FIG. 13, the management table stores the number of threads for data processing, the number of threads for communication processing, a maximum number of buffers, a server timeout time, a buffer size, and a process stop flag. The process stop flag is a flag for determining whether or not a process of the server 10 is stopped. The buffer size is set to be at most the amount of data that may be transmitted by the thread 104 for transmission processing at one time.

Returning to the description of FIG. 12, the initialization processing unit 101 initializes the content of a request management table and a result management table in the management data storage unit 105, of the processing request storage unit 106, and of the processing result storage unit 107 (step S3).

The initialization processing unit 101 generates a semaphore for reception processing, a semaphore for data processing, and a semaphore for transmission processing, and stores the semaphores in the management data storage unit 105 (step S5).

FIG. 14 illustrates an example semaphore generated in step S5. In the example of FIG. 14, a value indicating LOCK or a value indicating UNLOCK is stored for each of the semaphore for reception processing, the semaphore for data processing, and the semaphore for transmission processing. The semaphore for reception processing is a semaphore for controlling the operation of the thread 102 for reception processing. The semaphore for data processing is a semaphore for controlling the operation of the thread 103 for data processing. The semaphore for transmission processing is a semaphore for controlling the operation of the thread 104 for transmission processing.

Returning to the description of FIG. 12, the initialization processing unit 101 sets the process stop flag in the management table to "OFF" (step S7).

The initialization processing unit 101 generates a certain number of threads 103 for data processing, the certain number being equal to the number defined in the management table (step S9). The initialization processing unit 101 generates a certain number of threads 104 for transmission processing, the certain number being equal to the number of threads for communication processing defined in the management table (step S11). The initialization processing unit 101 generates a certain number of threads 102 for reception processing, the certain number being equal to the number of threads for communication processing defined in the management table (step S13).

The initialization processing unit 101 performs command reception processing (step S15). The command reception processing will be described with reference to FIG. 15.

Figure 15:
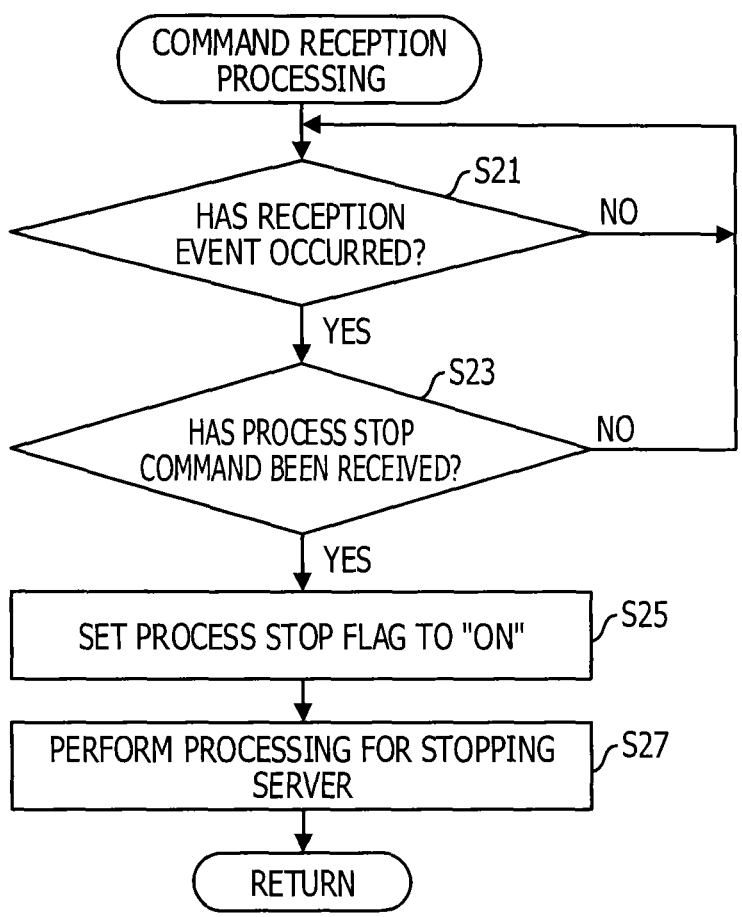
FIG. 15 illustrates a processing flow of command reception processing.

First, the initialization processing unit 101 determines whether a reception event has occurred (step S21 in FIG. 15). The reception event is an event in which command input is received, for example, from an administrator or the like. When a reception event has not occurred (No in step S21), the flow returns to the processing in step S21. On the other hand, when a reception event has occurred (Yes in step S21), the initialization processing unit 101 determines whether a process stop command has been received (step S23).

When a process stop command has not been received (No in step S23), the flow returns to the processing in step S21. On the other hand, when a process stop command has been received (Yes in step S23), the initialization processing unit 101 sets the process stop flag in the management table to "ON" (step S25).

The initialization processing unit 101 performs processing for stopping the process of the server 10 (step S27). The flow then returns to invoking processing and the command reception processing is exited.

By performing the processing described above, the initialization is completed and processing may be performed for a processing request received from one of the client apparatuses 30 and 31.

Next, the reception processing performed by the thread 102 for reception processing will be described with reference to FIGS. 16 to 22. First, the thread 102 for reception processing sets a local variable "result code" to "normal" (step S31 in FIG. 16) and sets a variable "processing number" to 0 (step S33). In the following, a local variable is denoted as a variable "***". A value in a table and a global variable are not enclosed with a double quotation mark.

The thread 102 for reception processing determines whether a processing request has been received from the client apparatus 30 or 31 (step S35). When a processing request has not been received (No route in step S35), the processing flow proceeds to the processing in step S75 of FIG. 22 via a terminal A. The processing after the terminal A will be described later.

FIG. 17 illustrates an example processing request. In the example of FIG. 17, the processing request includes control data and a request body. The control data includes the IP address of the server, the port number of the server, the client ID, a request number, the IP address of the client apparatus, the port number of the client apparatus, the process ID of a process that is in execution in the client apparatus, the thread ID of a thread that is in execution in the client apparatus, a session ID and a transmission time of the processing request. The request body includes a processing type, the target of the processing request, input information, and out information. The session ID is an ID that is notified to a client apparatus from the server at the time of establishment of connection. The input information is information that is used for execution of data processing. The output information is information that designates a target portion of data processing.

Figure 16:
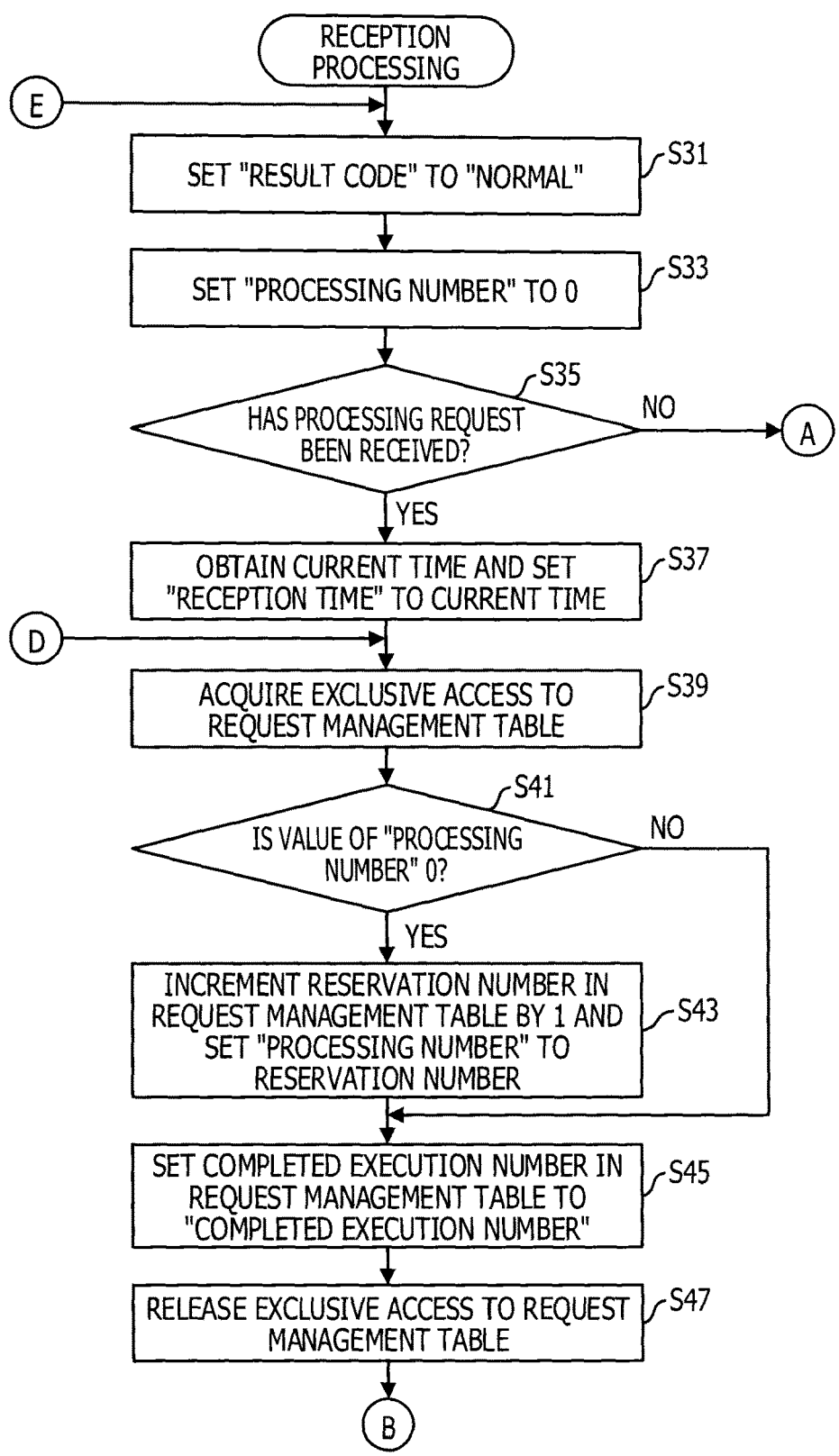
FIG. 16 illustrates a processing flow of reception processing.

Returning to the description of FIG. 16, when a processing request has been received (Yes in step S35), the thread 102 for reception processing obtains the current time from a system clock for example, and sets variable "reception time" to the current time (step S37).

The thread 102 for reception processing acquires exclusive access to the request management table stored in the management data storage unit 105 (step S39).

FIG. 18 illustrates an example data stored in the request management table. In the example of FIG. 18, the request management table stores exclusion information, a request number, a reservation number, an execution number, and a completed execution number. In step S39, for example, the exclusion information in the request management table is set to a value indicating acquisition of exclusive access. The thread 102 for reception processing, which has acquired exclusive access, is able to refer to and update the request management table.

Returning to the description of FIG. 16, the thread 102 for receiving processes determines whether the variable "processing number" is 0 (step S41). When the variable "processing number" is not 0 (No in step S41), the flow proceeds to the processing in step S45. When the variable "processing number" is 0 (Yes in step S41), the thread 102 for reception processing increments the reservation number in the request management table by 1 and sets the variable "processing number" to the reservation number (step S43).

The thread 102 for reception processing sets the variable "completed execution number" to the completed execution number in the request management table (step S45).

The thread 102 for reception processing releases the exclusive access to the request management table (step S47). In step S47, for example, the exclusion information in the request management table is set to a value indicating release of exclusive access. The processing flow proceeds to the processing in step S49 of FIG. 19 via the terminal B.

Figure 19:
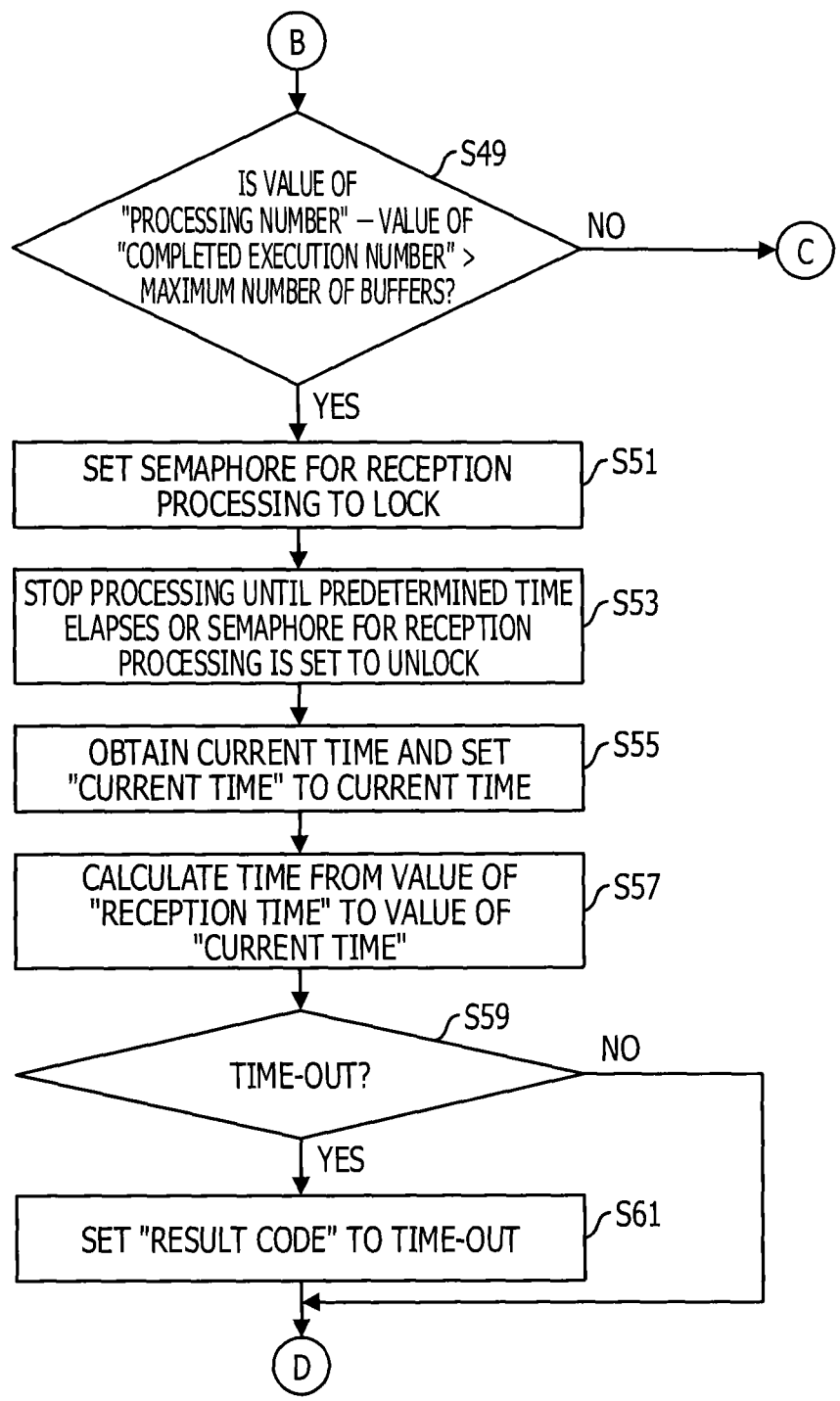
FIGS. 19 and 20 illustrate a processing flow of reception processing.

Moving on to the description of FIG. 19, the thread 102 for reception processing determines whether it is satisfied that (the value of the variable "processing number"—the value of the variable "completed execution number")>(the maximum number of buffers in the management table) (step S49). When this relationship is not satisfied (No in step S49), the processing flow proceeds to the processing in step S63 of FIG. 20 via terminal C. When the relationship is satisfied (Yes in step S49), the thread 102 for reception processing sets the semaphore for reception processing stored in the management data storage unit 105 to a value indicating LOCK (step S51).

The thread 102 for reception processing is stopped until a predetermined time (for example, 100 milliseconds) elapses or the semaphore for reception processing is set to a value indicating UNLOCK (step S53). The semaphore for reception processing is set to a value indicating UNLOCK in data processing, which will be described later.

When a predetermined time elapses or the semaphore for reception processing is set to a value indicating UNLOCK, the thread 102 for reception processing obtains the current time from a system clock for example, and sets variable "current time" to the current time (step S55).

The thread 102 for reception processing calculates the time from the value of the variable "reception time" to the value of the variable "current time" (step S57).

The thread 102 for reception processing determines whether time-out has occurred (step S59). In step S59, it is determined whether the time calculated in step S57 is longer than the server timeout in the management table. When time-out has not occurred (No in step S59), the processing flow returns to the processing in step S39 of FIG. 16 via terminal D.

On the other hand, when time-out has occurred (Yes in step S59), the thread 102 for reception processing sets the variable "result code" to time-out (step S61). The processing flow returns to the processing in step S39 of FIG. 16 via the terminal D.

The processing after the terminal C of FIG. 20 will be described. The thread 102 for reception processing acquires exclusive access to one of the regions corresponding to numbers 1 to N (N is the maximum number of buffers) in the processing request storage unit 106, the one region corresponding to the value calculated by (the value of variable processing number % the maximum number of buffers) (step S63 in FIG. 20) where "%" is the modulus operator. For example, when the value of the variable "processing number" is 102 and the maximum number of buffers is 100, the remainder 2 is added to 1, and exclusive access to a region corresponding to "3" is acquired.

FIG. 21 illustrates an example data stored in the processing request storage unit 106. In the example of FIG. 21, there are provided N regions of exclusion information, N regions of reception time, N regions of result code, N regions of client ID, and N regions of buffer. In the result code, "0" indicates normal and "1" indicates time-out.

Figure 20:
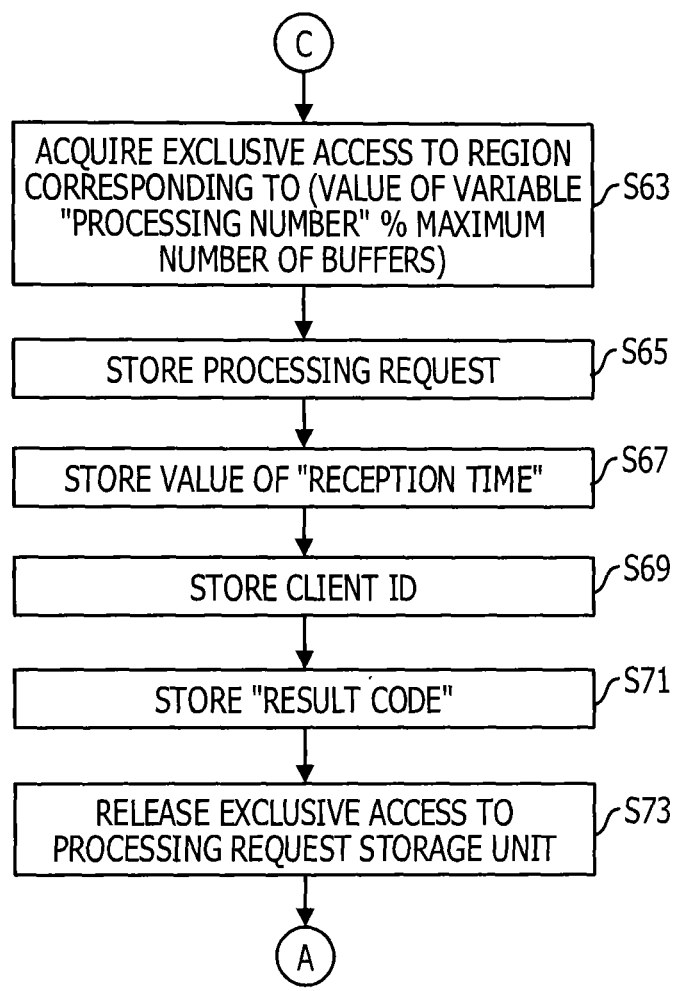

Returning to the description of FIG. 20, the thread 102 for reception processing stores a processing request in the buffer to which exclusive access has been acquired in step S63 (step S65). The thread 102 for reception processing stores the value of the variable "reception time" in the region to which exclusive access has been acquired in step S63 (step S67). The thread 102 for reception processing stores the client ID of the transmission source of the processing request in the region to which exclusive access has been acquired in step S63 (step S69). The thread 102 for reception processing stores the value of the variable "result code" in the region to which exclusive access has been acquired in step S63 (step S71).

The thread 102 for reception processing releases the exclusive access to the processing request storage unit 106 (step S73). The processing flow proceeds to the processing in step S75 of FIG. 22 via the terminal A.

Figure 22:
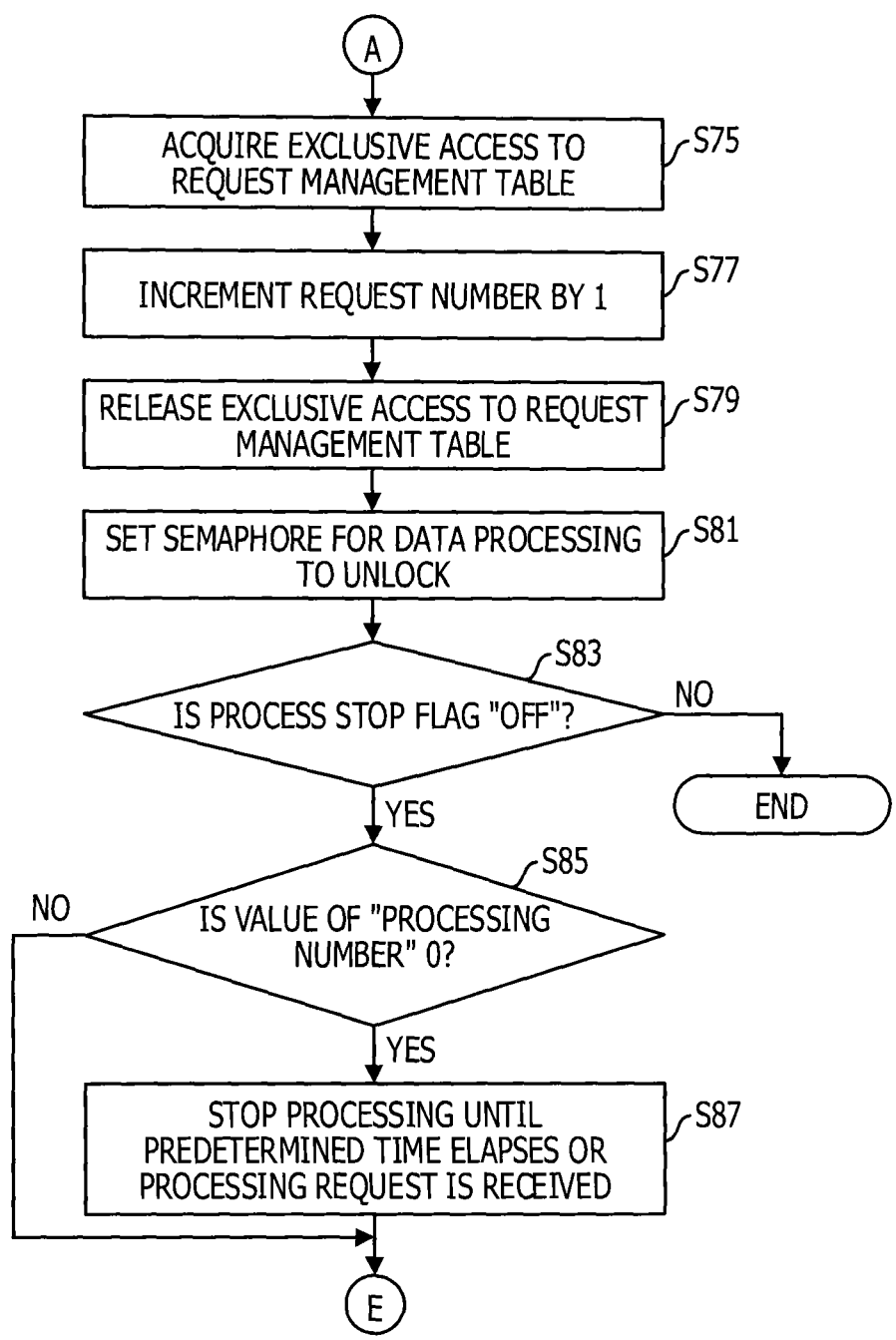
FIG. 22 illustrates a processing flow of reception processing.

Moving on to the description of FIG. 22, the thread 102 for reception processing acquires exclusive access to the request management table (step S75 in FIG. 22), and increments the request number in the request management table by 1 (step S77). The thread 102 for reception processing then releases the exclusive access to the request management table (step S79).

The thread 102 for reception processing sets the semaphore for data processing in the management data storage unit 105 to a value indicating UNLOCK (step S81).

The thread 102 for reception processing determines whether the process stop flag in the management table is set to "OFF" (step S83). When the process stop flag is set to "ON" (No in step S83), a process stop command has been received and thus the reception processing is terminated.

On the other hand, when the process stop flag is set to "OFF" (Yes in step S83), the thread 102 for reception processing determines whether the value of the variable "processing number" is 0 (step S85).

When the value of the variable "processing number" is not 0 (No in step S85), the processing flow returns to step S31 of FIG. 16 via terminal E. On the other hand, when the value of the variable "processing number" is 0 (Yes in step S85), the thread 102 for reception processing stands by until a predetermined time (for example, 100 milliseconds) elapses or a processing request is received (step S87).

When a predetermined time elapses or a processing request is received the processing flow returns to step S31 of FIG. 16 via the terminal E.

By performing the processing described above, data processing may be performed for the processing request stored in the buffer of the processing request storage unit 106. In addition, the processing request storage unit 106 may be used cyclically.

Next, the data processing performed by the thread 103 for data processing will be described with reference to FIGS. 23 to 38.

Figure 23:
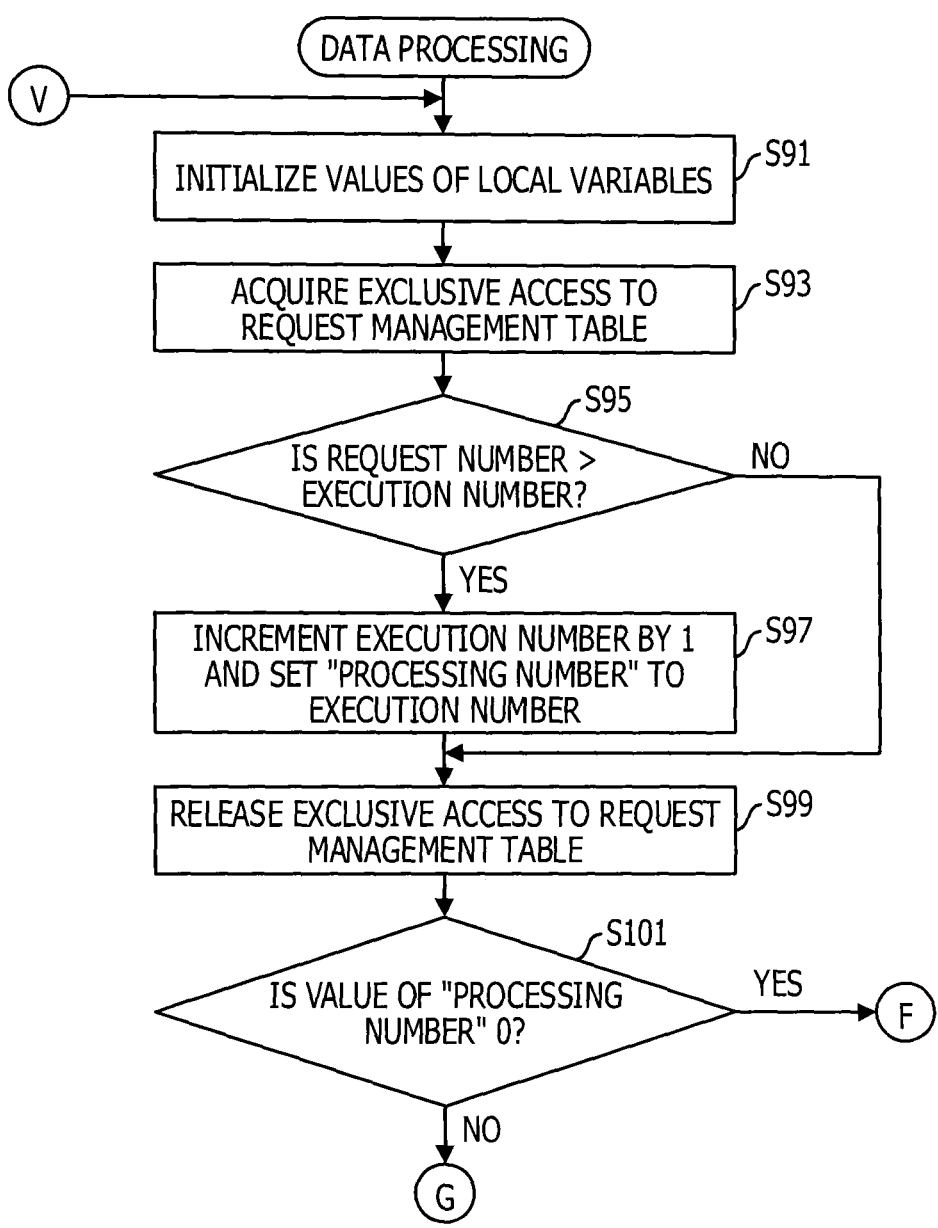
FIGS. 23, 24, 25, and 26 are flow charts illustrating a processing flow of data processing.

First, the thread 103 for data processing initializes the values of the local variables (step S91 in FIG. 23). Specifically, the local variables used in data processing are set to 0. However, variable "control data size" is set to a predetermined value, and variable "block size" is set to the buffer size defined in the management table—the value of the variable "control data size"—size of common control data. The common control data is control data that is added to a processing result when a plurality of processing results is integrated.

The thread 103 for data processing acquires exclusive access to the request management table (step S93).

The thread 103 for data processing determines whether the request number in the request management table is greater than the execution number in the request management table (step S95). When the request number in the request management table is not greater than the execution number in the request management table (No in step S95), the flow proceeds to the processing in step S99.

On the other hand, when the request number in the request management table is greater than the execution number in the request management table (Yes in step S95), the thread 103 for data processing increments the execution number in the request management table by 1 in order to process the next processing request, and sets the variable "processing number" to the execution number (step S97).

The thread 103 for data processing releases the exclusive access to the request management table (step S99).

The thread 103 for data processing determines whether the value of the variable "processing number" is 0 (step S101). When the value of the variable "processing number" is 0 (Yes in step S101), the processing flow proceeds to the processing in step S265 of FIG. 38 via terminal F.

Figure 24:
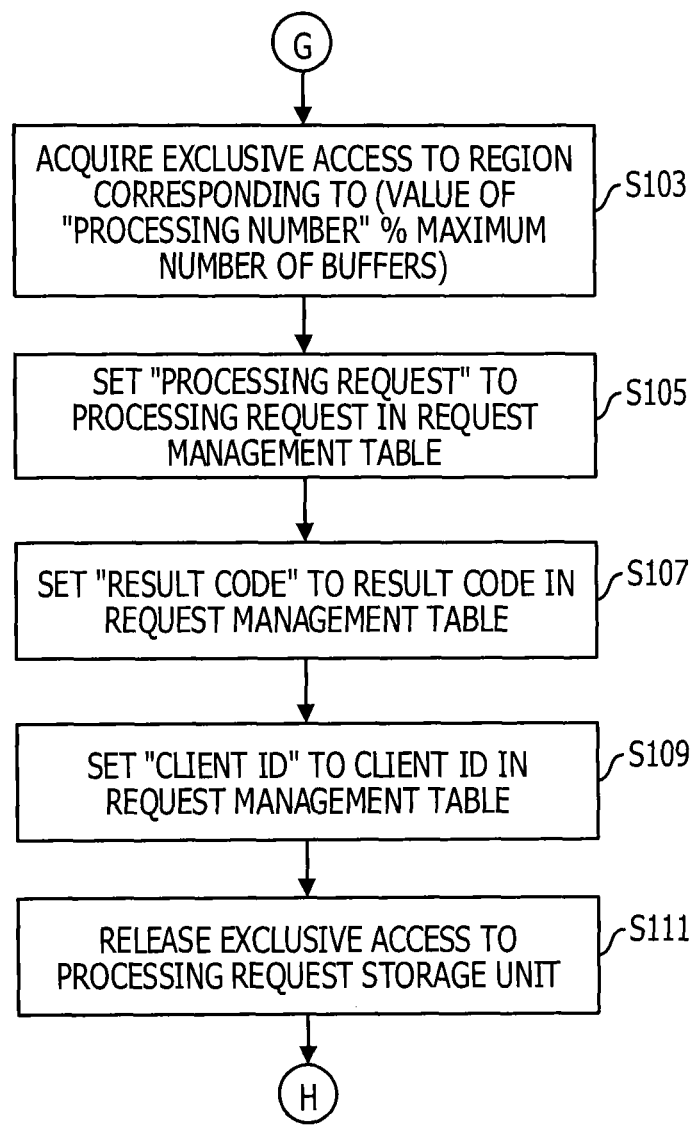

On the other hand, when the value of the variable "processing number" is not 0 (No in step S101), the processing flow proceeds to the processing in step S103 of FIG. 24 via terminal G.

Moving on to the description of FIG. 24, the thread 103 for data processing acquires exclusive access to one of the regions corresponding to numbers 1 to N (N is the maximum number of buffers) in the processing request storage unit 106, the one region corresponding to the value calculated by (the value of variable processing number % the maximum number of buffers) (step S103 in FIG. 24).

The thread 103 for data processing sets variable "processing request" to the processing request in the region to which exclusive access has been acquired (step S105). The thread 103 for data processing sets the variable "result code" to the result code in the region to which exclusive access has been acquired (step S107). The thread 103 for data processing sets the variable "client ID" to the client ID in the region to which exclusive access has been acquired (step S109).

The thread 103 for data processing releases the exclusive access to the processing request storage unit 106 (step S111). The processing flow proceeds to the processing in S113 of FIG. 25 via terminal H.

Figure 25:
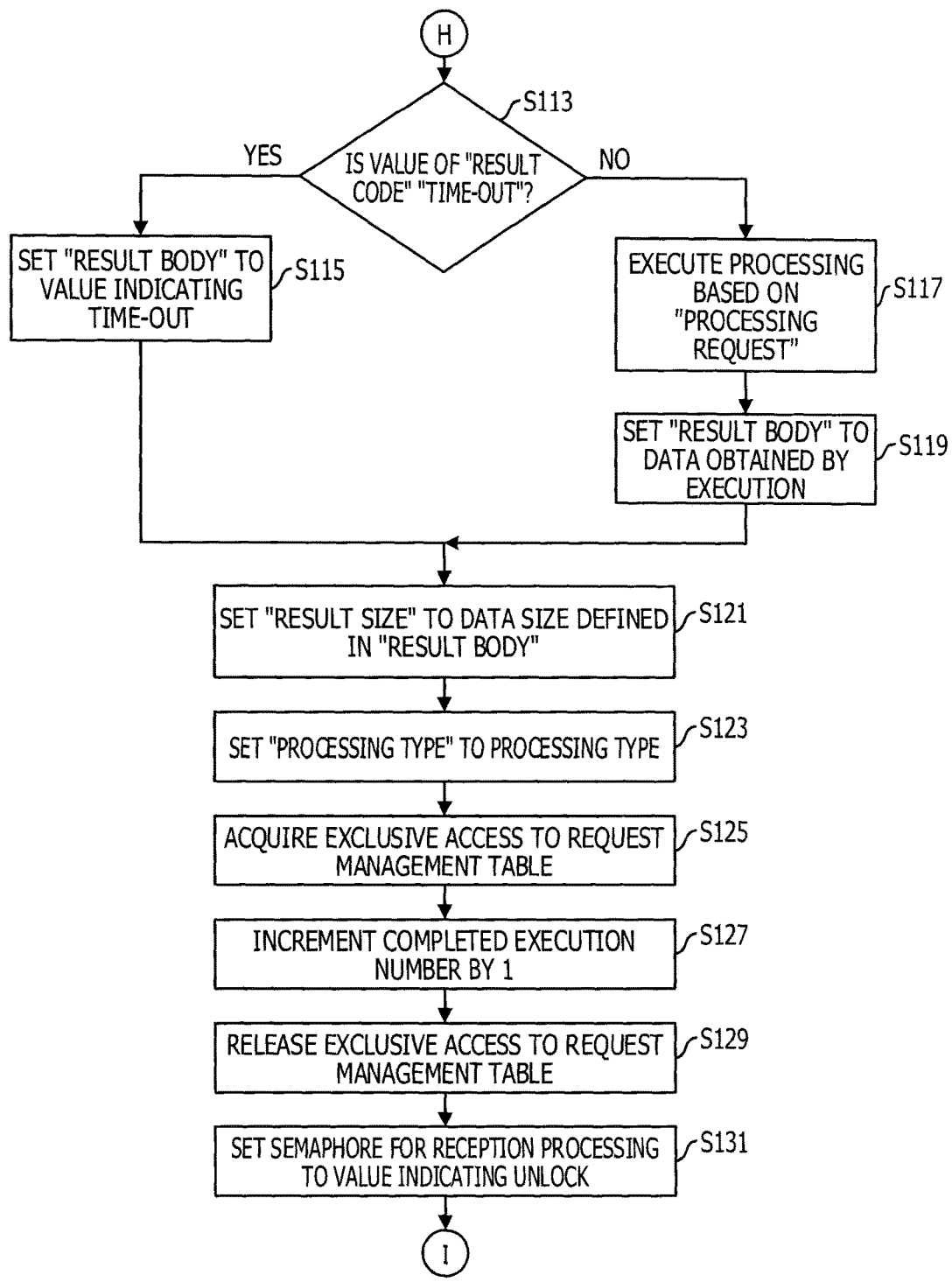

Moving on to the description of FIG. 25, the thread 103 for data processing determines whether the value of the variable "result code" is "time-out" (step S113 in FIG. 25).

When the value of the variable "result code" is "time-out" (Yes in step S113), the thread 103 for data processing sets the variable "result body" to a value indicating time-out (step S115). Then the flow proceeds to the processing in step S121.

When the value of the variable "result code" is not "time-out" (No in step S113), the thread 103 for data processing executes processing on the data stored in the data storage unit 108 (step S117) based on the value of the variable "processing request".

The thread 103 for data processing sets the variable "result body" to the data obtained by the execution in step S117 (step S119).

The thread 103 for data processing sets the variable "result size" to the data size defined in the variable "result body" (step S121). The thread 103 for data processing sets variable "processing type" to the processing type included in the variable "processing request" (step S123).

The thread 103 for data processing acquires exclusive access to the request management table (step S125), and increments the completed execution number in the request management table by 1 (step S127). The thread 103 for data processing then releases the exclusive access to the request management table (step S129).

The thread 103 for data processing sets the semaphore for reception processing in the management data storage unit 105 to a value indicating UNLOCK (step S131). The processing flow proceeds to the processing in step S133 of FIG. 26 via terminal I.

Figure 26:
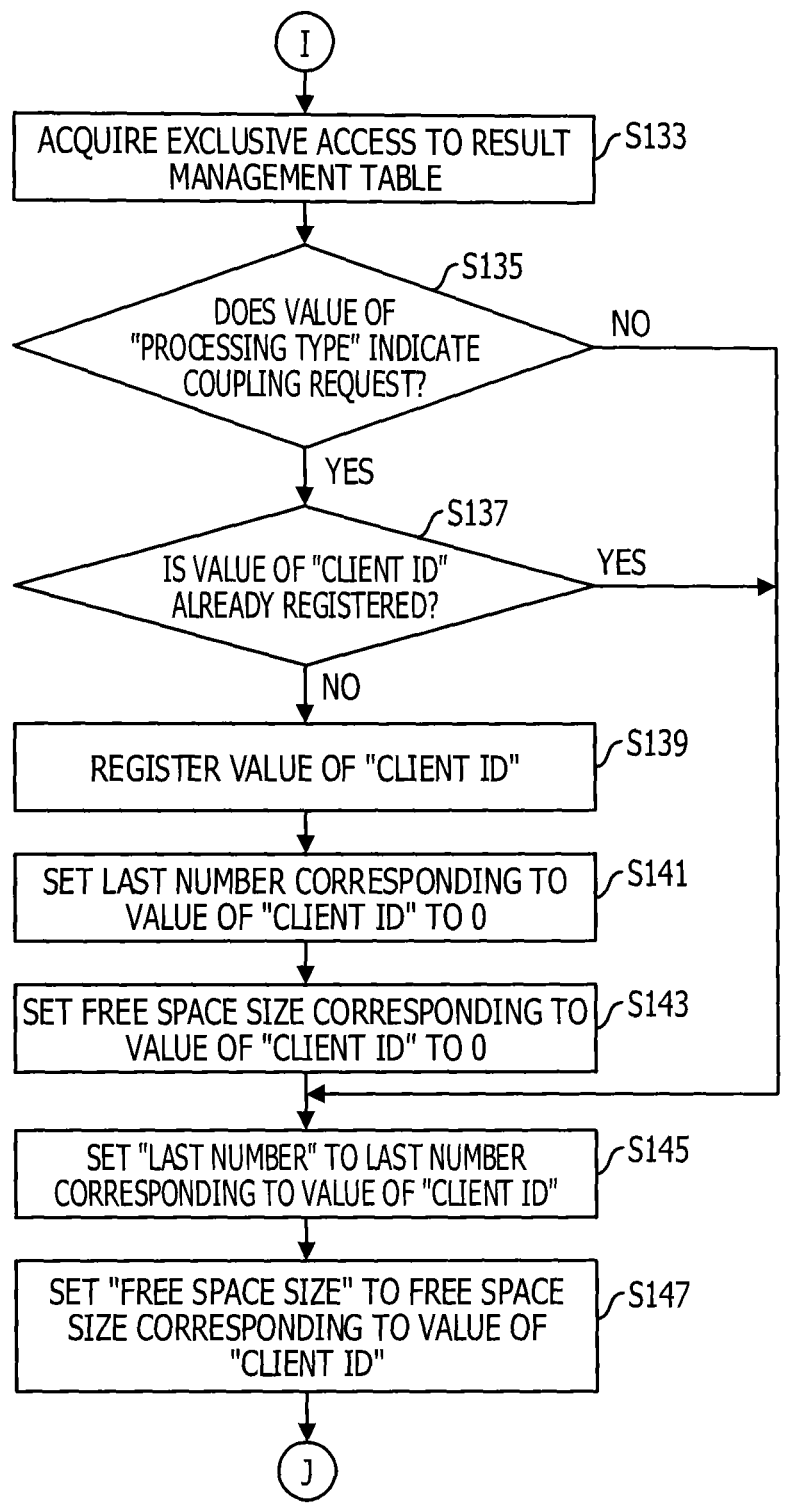

Moving on to the description of FIG. 26, the thread 103 for data processing acquires exclusive access to the result management table stored in the management data storage unit 105 (step S133 in FIG. 26).

FIG. 27 illustrates an example result management table. In the example of FIG. 27, the result management table stores an exclusion information, a completed transmission number, a result number, and a reservation number. In addition, for each destination, the client ID, the last number, and free space size are stored. The last number is the number of one of processing results of a certain destination, the one being stored in a buffer most recently, and the free space size is the free space size of the buffer.

Returning to description of FIG. 26, the thread 103 for data processing determines whether the value of the variable "processing type" indicates that the processing request is a coupling request (step S135). When the variable "processing type" does not indicate that the processing request is a coupling request (No in step S135), the flow proceeds to the processing in step S145.

When the variable "processing type" indicates that the processing request is a coupling request (Yes in step S135), the thread 103 for data processing determines whether the value of the variable "client ID" is already registered in the result management table (step S137). When the value is already registered (Yes in step S137), the flow proceeds to the processing in step S145.

When the value of the variable "client ID" is not registered in the management table yet (No in step S137), the thread 103 for data processing registers the value of the variable "client ID" in the result management table (step S139).

The thread 103 for data processing sets the last number to 0, the last number corresponding to the value of the variable "client ID" (step S141). The thread 103 for data processing sets free space size to 0, the free space size corresponding to the value of the variable "client ID" (step S143).

The thread 103 for data processing sets the variable "last number" to the last number corresponding to the value of the variable "client ID" (step S145). The thread 103 for data processing sets the variable "free space size" to the free space size corresponding to the value of the variable "client ID" (step S147). The processing flow proceeds to the processing in step S149 of FIG. 28 via terminal J.

Figure 28:
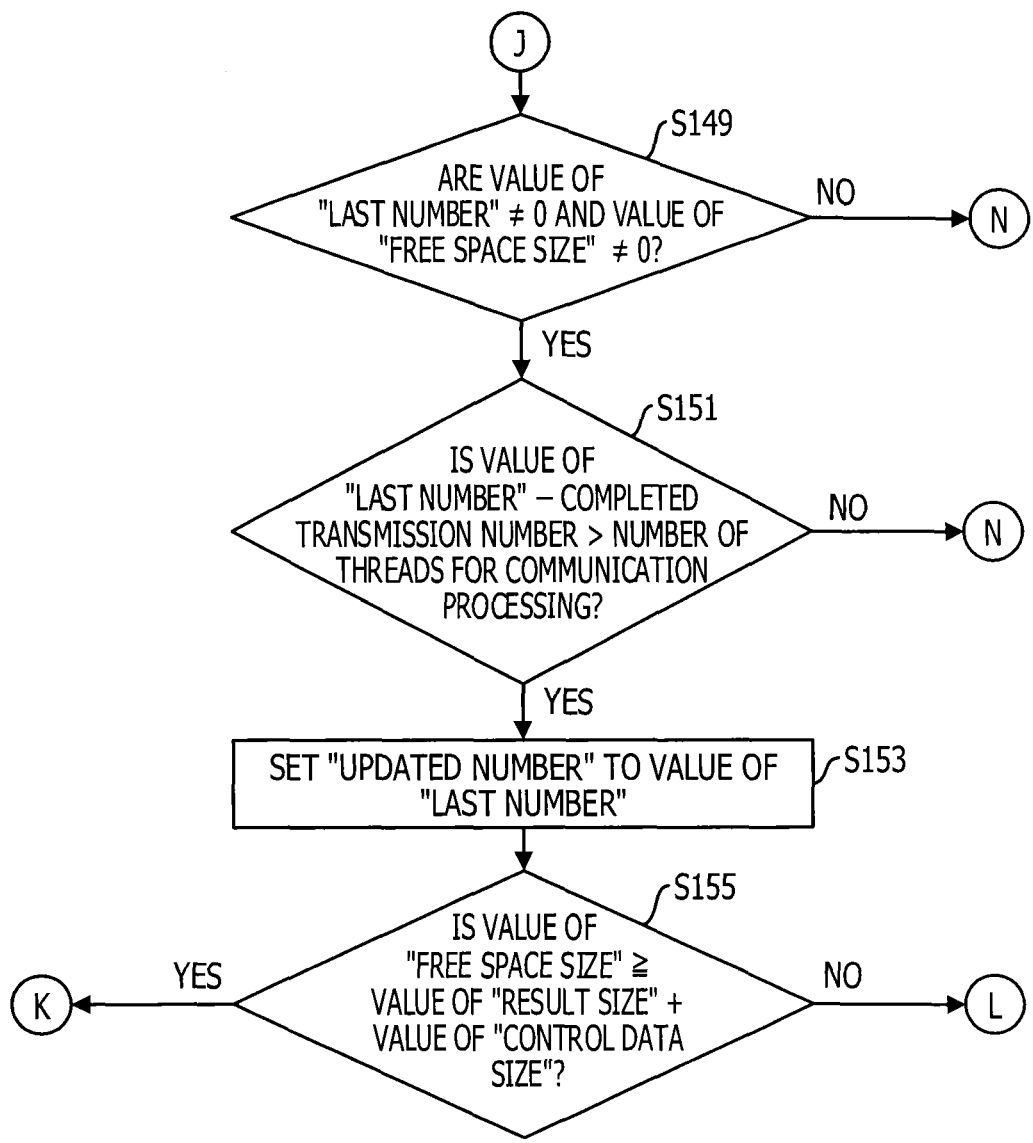
FIGS. 28, 29, 30, 31, and 32 illustrate a processing flow of data processing.

Moving on to the description of FIG. 28, the thread 103 for data processing determines whether it is satisfied that the value of the variable "last number"≠0 and the value of the variable "free space size"≠0 (step S149). When the value of the variable "last number"≠0 and the value of the variable "free space size"≠0 are not satisfied (No in step S149), the processing flow proceeds to the processing in step S177 of FIG. 31 via terminal N.

When it is satisfied that the value of the variable "last number"≠0 and the value of the variable "free space size"≠0 (Yes in step S149), the thread 103 for data processing reads a completed transmission number from the management table and the number of threads for communication processing from the management table. The thread 103 for data processing then determines whether it is satisfied that (the value of the variable "last number"–the completed transmission number)>the number of threads for communication processing (step S151).

Figure 31:
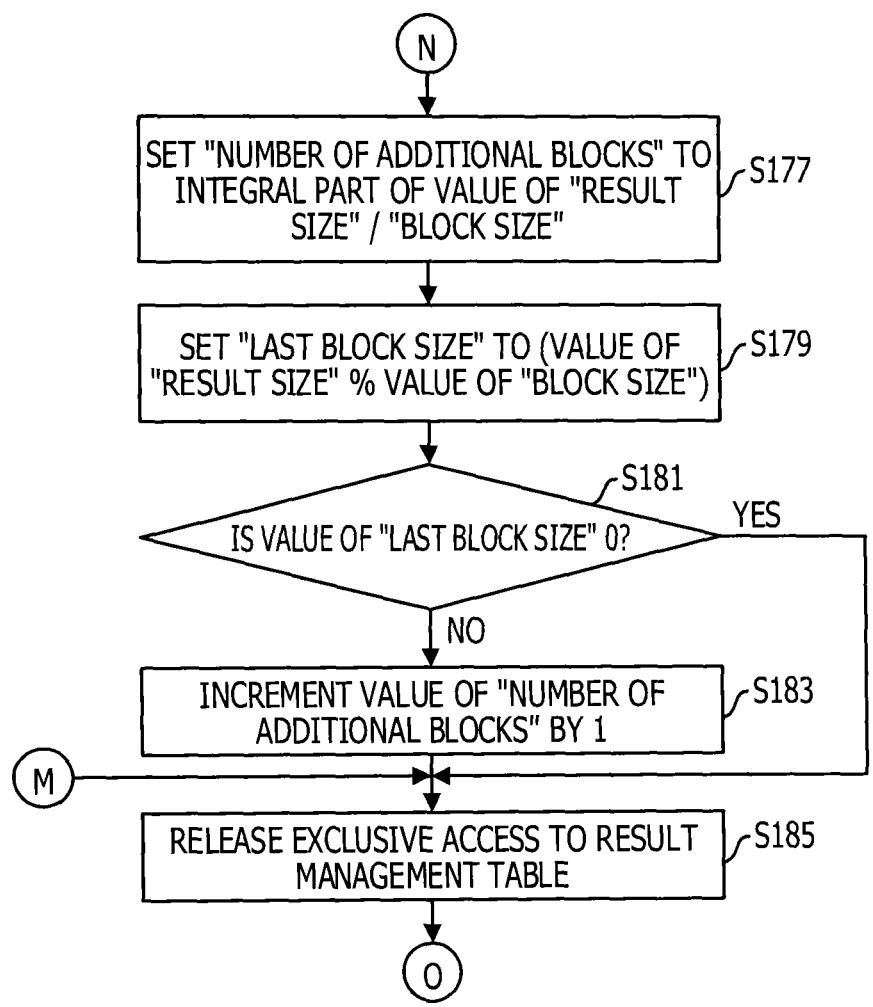

When (the value of the variable "last number"−the completed transmission number)>the number of threads for communication processing is not satisfied (No in step S151), integration processing is not performed and the processing flow proceeds to the processing in step S177 of FIG. 31 via terminal N.

When it is satisfied that (the value of the variable "last number"−the completed transmission number)>the number of threads for communication processing (Yes in step S151), integration processing is performed and the thread 103 for data processing sets variable "updated number" to the value of the variable "last number" (step S153).

The thread 103 for data processing determines whether it is satisfied that the value of the variable "free space size"≥ (the value of the variable "result size"+the value of the variable "control data size") (step S155). When it is satisfied that the value of the variable "free space size"≥(the value of the variable "result size"+the value of the variable "control data size") (Yes in step S155), the processing flow proceeds to the processing in step S157 of FIG. 29 via terminal K. On the other hand, when the value of the variable "free space size"≥(the value of the variable "result size"+the value of the variable "control data size") is not satisfied (No in step S155), the processing flow proceeds to the processing in step S165 of FIG. 30 via terminal L.

Figure 29:
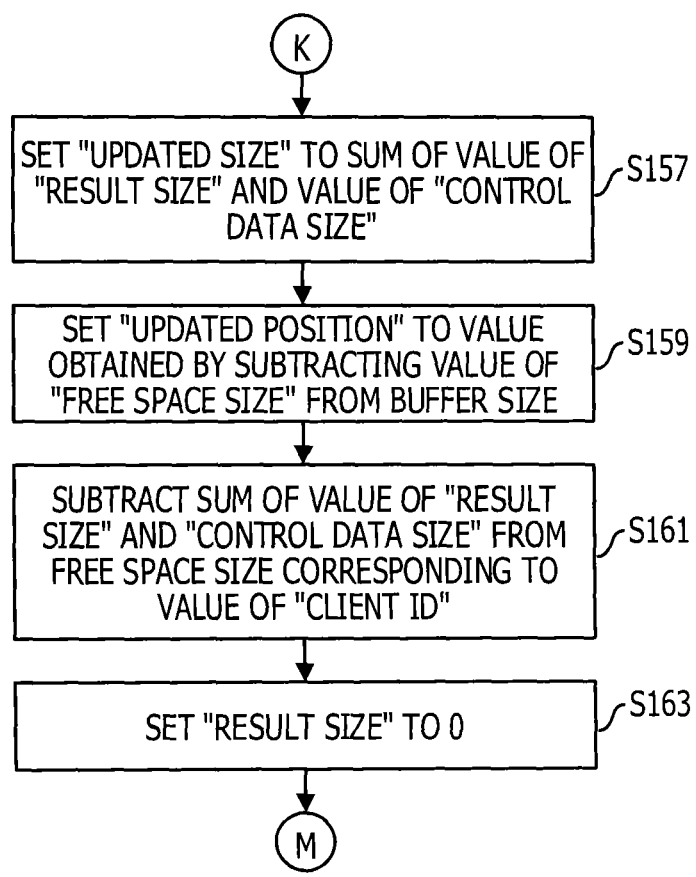

Moving on to the description of FIG. 29, the thread 103 for data processing sets variable "updated size" to the sum of the value of the variable "result size" and the value of the variable "control data size" (step S157 in FIG. 29).

The thread 103 for data processing sets the variable "updated position" to the value obtained by subtracting the value of the variable "free space size" from the buffer size defined in the management table (step S159).

The thread 103 for data processing subtracts the sum of the value of the variable "result size" and the value of the variable "control data size" from the free space size corresponding to the value of the variable "client ID" (step S161).

The thread 103 for data processing sets the variable "result size" to 0 (step S163). The processing flow proceeds to the processing in step S185 of FIG. 31 via terminal M.

Figure 30:
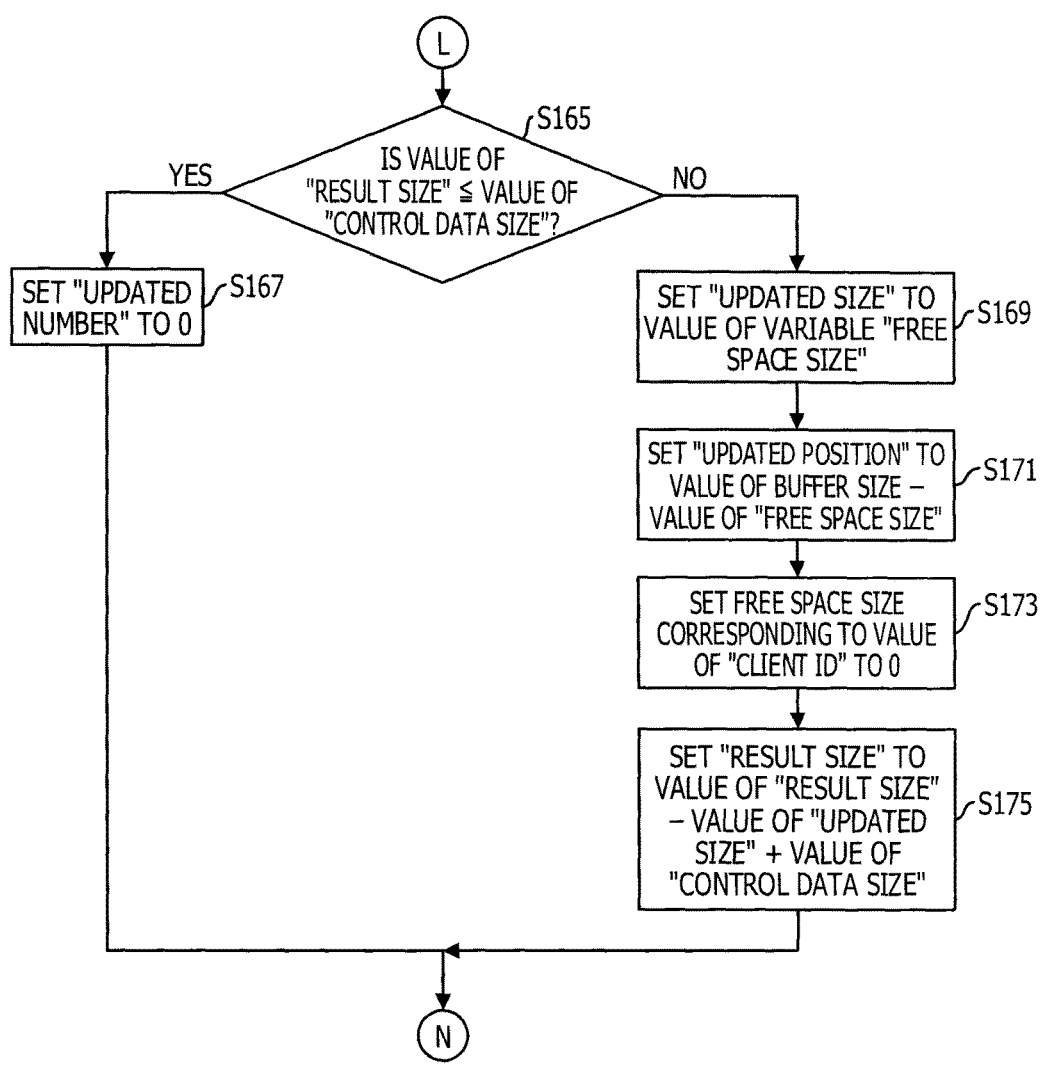

The processing after the terminal L of FIG. 30 will be described. The thread 103 for data processing determines whether it is satisfied that the value of the variable "result size"≤the value of the variable "control data size" (step S165 in FIG. 30).

When it is satisfied that the value of the variable "result size"≤the value of the variable "control data size" (Yes route in step S165), the thread 103 for data processing sets the variable "updated number" to 0 (step S167). The processing flow proceeds to the processing in step S177 of FIG. 31 via terminal N.

When the value of the variable "result size"≤the value of the variable "control data size" is not satisfied (No in step S165), the thread 103 for data processing sets the variable "updated size" to the value of the variable "free space size" (step S169).

The thread 103 for data processing sets the variable "updated position" to the value calculated by the buffer size defined in the management table−the value of the variable "free space size" (step S171).

The thread 103 for data processing sets a free space size to 0, the free space size being associated with the value of the variable "client ID" in the management table (step S173).

The thread 103 for data processing sets the value of the variable "result size" to the value calculated by (the value of the variable "result size"−the value of the variable "updated size"+the value of the variable "control data size") (step S175). The processing flow proceeds to the processing in step S177 of FIG. 31 via the terminal N.

Moving on to the description of FIG. 31, the thread 103 for data processing sets variable "number of additional blocks" to the integral part of the value calculated by (the value of the variable "result size"/the value of the variable "block size") (step S177 in FIG. 31).

The thread 103 for data processing sets variable "last block size" to the value calculated by (the value of the variable "result size" % the value of the variable "block size") (step S179).

The thread 103 for data processing determines whether the value of the variable "last block size" is 0 (step S181). When the value of the variable "last block size" is 0 (Yes in step S181), the flow proceeds to the processing in step S185.

When the value of the variable "last block size" is not 0 (No in step S181), the thread 103 for data processing increments the value of the variable "number of additional blocks" by 1 (step S183).

The thread 103 for data processing releases the exclusive access to the result management table (step S185). The processing flow proceeds to the processing in step S187 of FIG. 32 via terminal O.

Figure 32:
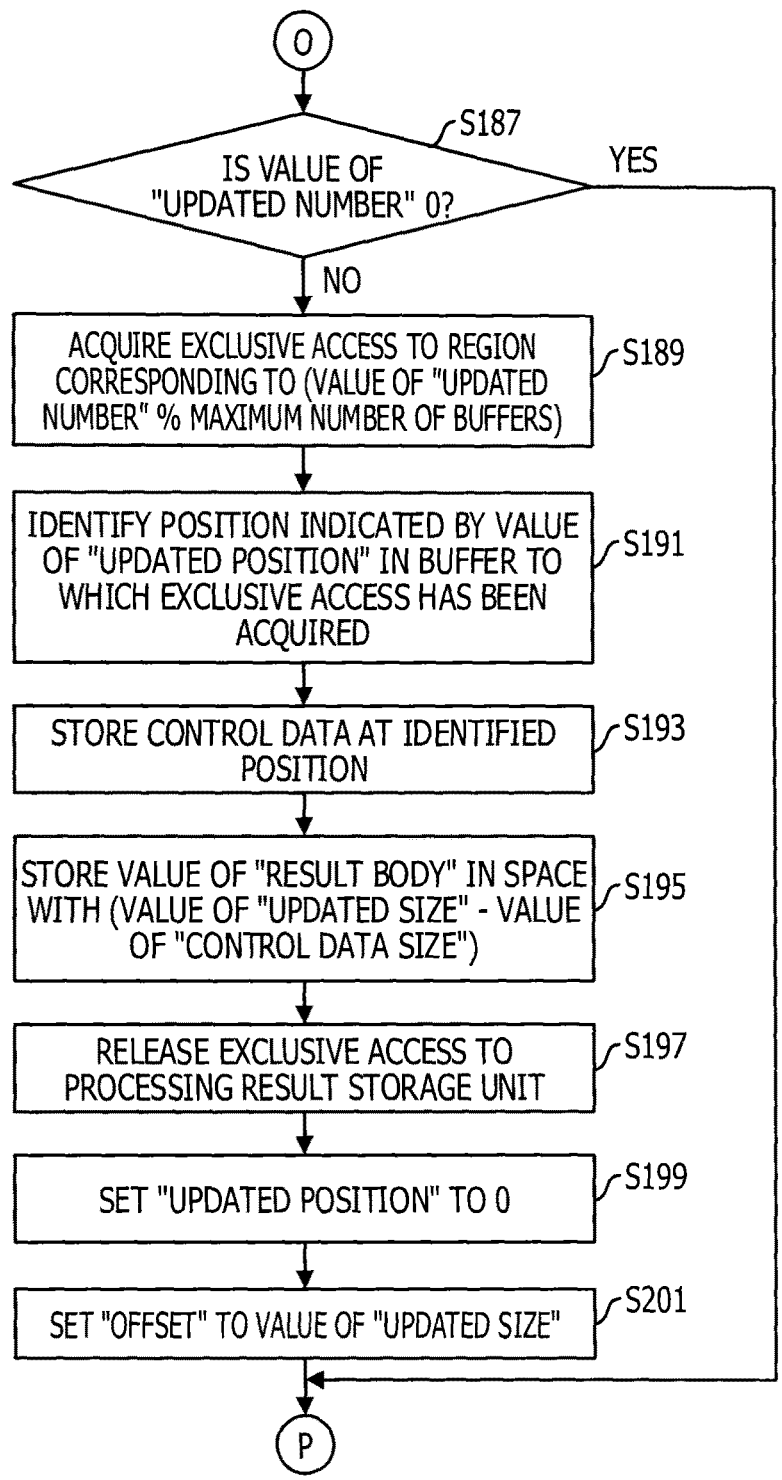

Moving on to the description of FIG. 32, the thread 103 for data processing determines whether the value of the variable "updated number" is 0 (step S187 in FIG. 32).

Figure 34:
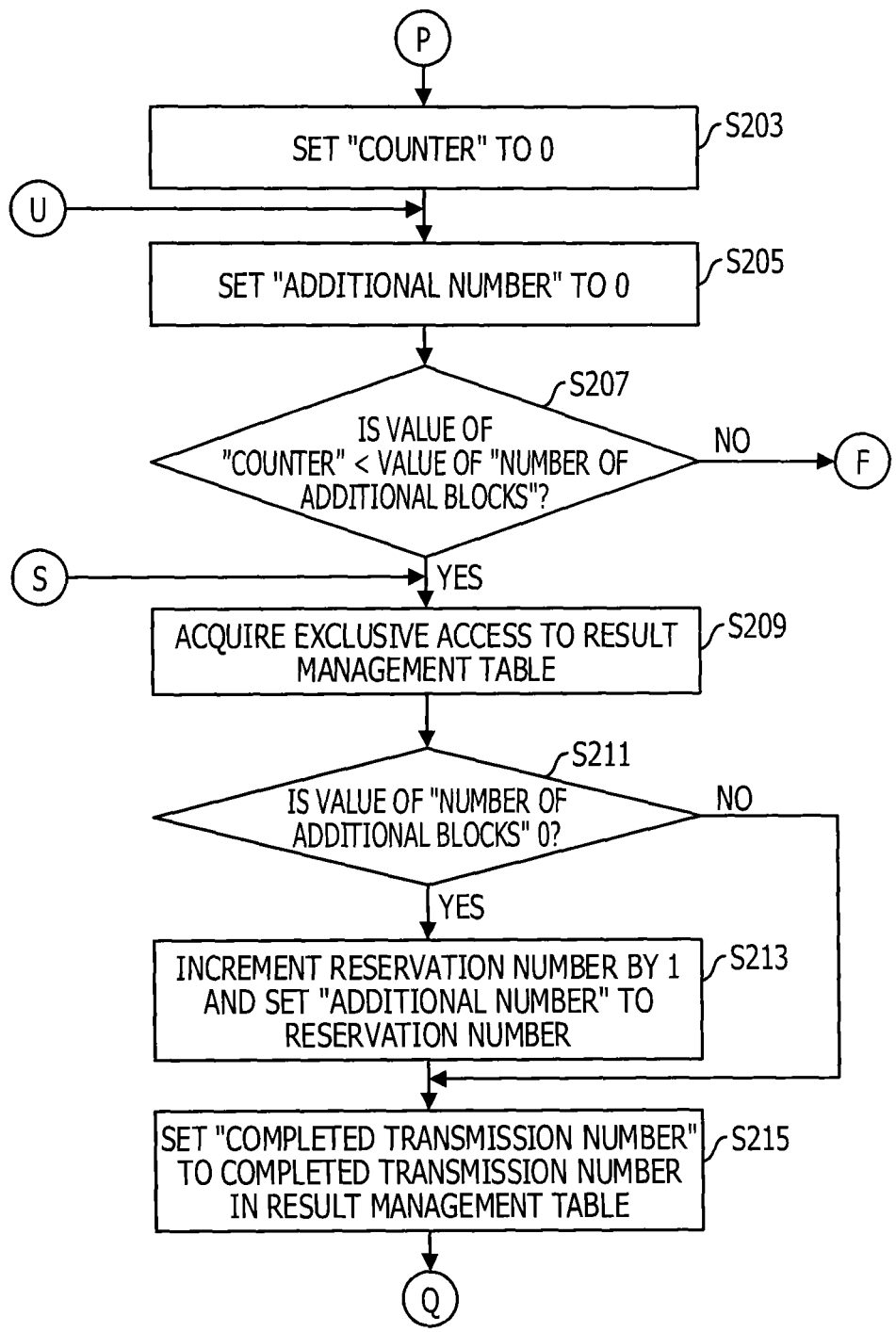
FIGS. 34, 35, 36, 37, and 38 illustrate a processing flow of data processing.

When the value of the variable "updated number" is 0 (Yes in step S187), the processing flow proceeds to the processing in step S203 of FIG. 34 via terminal P.

When the value of the variable "updated number" is not 0 (No in step S187), the thread 103 for data processing acquires exclusive access to one of the regions corresponding to numbers 1 to N (N is the maximum number of buffers) in the processing result storage unit 107, the one region corresponding to the value calculated by (the value of the variable "updated number" % the maximum number of buffers) (step S189).

FIG. 33 illustrates an example data stored in the processing result storage unit 107. In the example of FIG. 33, there are provided N regions of exclusion information, N regions of reception time, N regions of result code, N regions of client ID, and N regions of buffer. In the result code, "0" indicates normal and "1" indicates time-out.

Returning to description of FIG. 32, the thread 103 for data processing identifies a position in the buffer to which exclusive access has been acquired, the position being indicated by the value of the variable "updated position" (step S191).

The thread 103 for data processing stores control data at the position identified in step S191, the control data being based on the processing request corresponding to the processing result (step S193). Here, when the value of the variable "number of additional blocks" is one or greater, "state" item included in the control data is set to a value (for example, 1) indicating incompletion.

The thread 103 for data processing stores the value of the variable "result body" in a certain space subsequent to the control data set in step S193, the certain space being equal to the size calculated by (the value of the variable "updated size"−the value of the variable "control data size") (step S195).

The thread 103 for data processing releases the exclusive access to the processing result storage unit 107 (step S197).

The thread 103 for data processing sets the variable "updated position" to 0 (step S199). The thread 103 for data processing sets variable "offset" to the value of the variable "updated size" (step 201). Processing shifts to processing of step S203 of FIG. 34 via terminal P.

Moving on to the description of FIG. 34, the thread 103 for data processing sets the value of variable "counter" to 0 (step S203 in FIG. 34). The thread 103 for data processing sets variable "additional number" to 0 (step S205).

The thread 103 for data processing determines whether it is satisfied that the value of the variable "counter"<the value of the variable "number of additional blocks" (step S207). When it is not satisfied that the value of the variable "counter"<the value of the variable "number of additional blocks" (No in step S207), the processing flow proceeds to the processing in step S265 of FIG. 38 via terminal F.

When it is satisfied that the value of the variable "counter"<the value of the variable "number of additional blocks" (Yes in step S207), the thread 103 for data processing acquires exclusive access to the result management table (step S209).

The thread 103 for data processing determines whether the value of the variable "number of additional blocks" is 0 (step S211). When the value of the variable "number of additional blocks" is not 0 (No in step S211), the flow proceeds to the processing in step S215.

When the value of the variable "number of additional blocks" is 0 (Yes in step S211), the thread 103 for data processing increments the reservation number in the result management table by 1 and sets variable "additional number" to the reservation number (step S213).

The thread 103 for data processing sets the variable "completed transmission number" to the completed transmission number in the result management table (step S215). The processing flow proceeds to the processing in step S217 of FIG. 35 via terminal Q.

Figure 35:
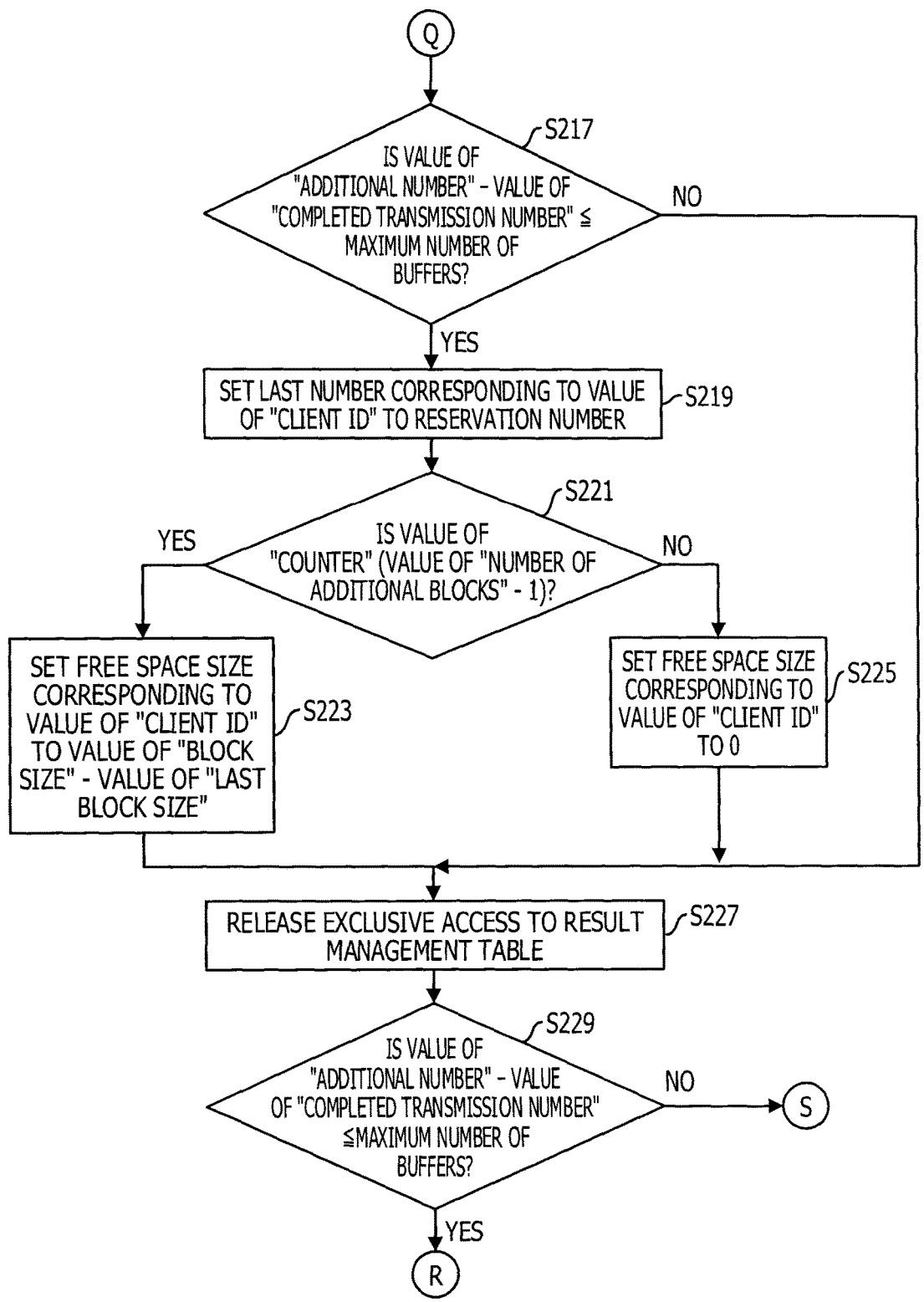

Moving on to the description of FIG. 35, the thread 103 for data processing determines whether it is satisfied that (the value of the variable "additional number"–the value of the variable "completed transmission number")≤the maximum number of buffers (step S217 in FIG. 35).

When it is not satisfied that (the value of the variable "additional number"–the value of the variable "completed transmission number")≤the maximum number of buffers (No in step S217), the flow proceeds to the processing in step S227.

When it is satisfied that (the value of the variable "additional number"–the value of the variable "completed transmission number")≤the maximum number of buffers (Yes in step S217), the thread 103 for data processing sets the last number corresponding to the value of the variable "client ID" in the result management table to the reservation number in the result management table (step S219).

The thread 103 for data processing determines whether the value of the variable "counter" is (the value of the variable "number of additional blocks"–1) (step S221).

When the value of the variable "counter" is (the value of the variable "number of additional blocks"–1) (Yes in step S221), the thread 103 for data processing sets the free space size corresponding to the value of the variable "client ID" to the value calculated by (the value of the variable "block size"–the value of the variable "last block size") (step S223). The flow then proceeds to the processing in step S227.

When the value of the variable "counter" is not (the value of the variable "number of additional blocks"–1) (No in step S221), the thread 103 for data processing sets the free space size corresponding to the value of the variable "client ID" to 0 (step S225). The thread 103 for data processing then releases the exclusive access to the result management table (step S227).

The thread 103 for data processing determines whether it is satisfied that the value of the variable "additional number"–the value of the variable "completed transmission number"≤the maximum number of buffers (step S229).

Figure 36:
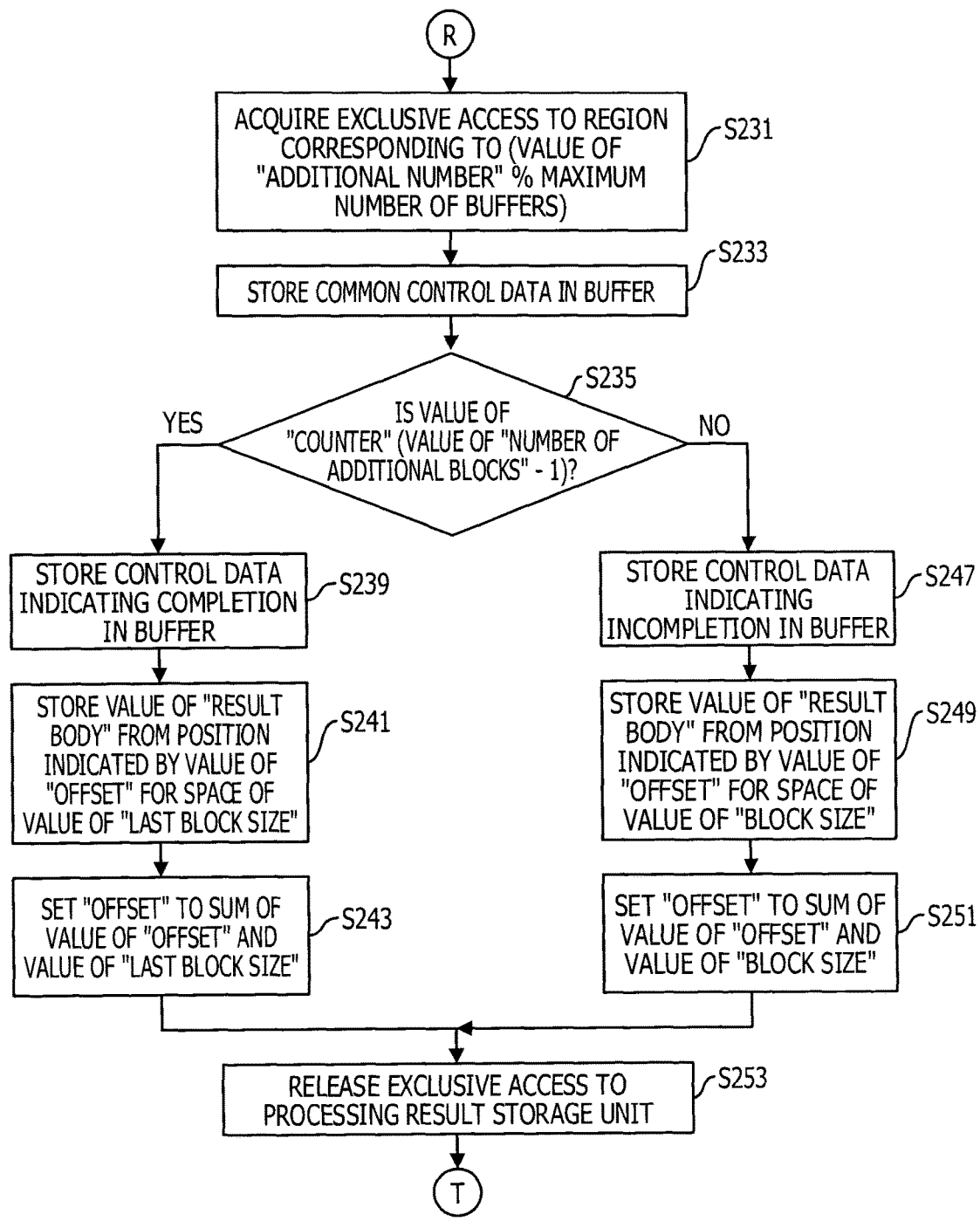

When it is satisfied that the value of the variable "additional number"–the value of the variable "completed transmission number"≤the maximum number of buffers (Yes in step S229), the processing flow proceeds to the processing in step S231 of FIG. 36 via terminal R. When it is not satisfied that the value of the variable "additional number"–the value of the variable "completed transmission number"≤the maximum number of buffers (No in step S229), the processing flow returns to the processing in step S209 of FIG. 34 via terminal S.

Moving on to the description of FIG. 36, the thread 103 for data processing acquires exclusive access to one of the regions corresponding to numbers 1 to N (N is the maximum number of buffers) in the processing result storage unit 107, the one region corresponding to the value calculated by (the value of the variable "additional number" % the maximum number of buffers) (step S231 in FIG. 36). The thread 103 for data processing then stores the common control data in the buffer to which exclusive access has been acquired in step S231 (step S233).

The thread 103 for data processing determines whether the value of the variable "counter" is (the value of the variable "number of additional blocks"–1) (step S235).

When the value of the variable "counter" is (the value of the variable "number of additional blocks"–1) (Yes in step S235), the thread 103 for data processing stores control data subsequent to the control data based on a processing request, the control data having "state" item which is set a value indicating completion (step S239).

The thread 103 for data processing stores the value of the variable "result body" subsequent to the control data from the position indicated by the value of the variable "offset" for the space of the value of the variable "last block size" (step S241).

The thread 103 for data processing sets the variable "offset" to the sum of the value of the variable "offset" and the value of the variable "last block size" (step S243). The flow then proceeds to the processing in step S253.

On the other hand, when the value of the variable "counter" is not (the value of the variable "number of additional blocks"–1) (No in step S235), the thread 103 for data processing stores control data subsequent to the control data based on a processing request, the control data having "state" item which is set a value indicating incompletion (step S247).

The thread 103 for data processing stores the value of the variable "result body" subsequent to the control data from the position indicated by the value of the variable "offset" for the space of the value of the variable "last block size" (step S249).

The thread 103 for data processing sets the variable "offset" to the sum of the value of the variable "offset" and the value of the variable "block size" (step S251).

The thread 103 for data processing releases the exclusive access to the processing result storage unit 107 (step S253). The processing flow proceeds to the processing in step S255 of FIG. 37 via terminal T.

Figure 37:
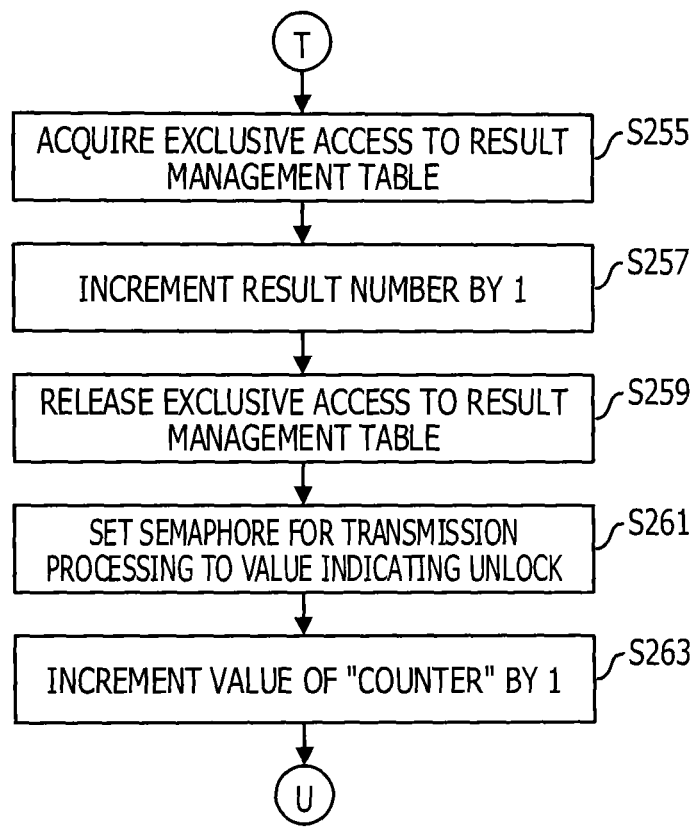

Moving on to the description of FIG. 37, the thread 103 for data processing acquires exclusive access to the result management table (step S255), and increments the result number in the result management table by 1 (step S257). The thread 103 for data processing then releases the exclusive access to the result management table (step S259).

The thread 103 for data processing sets the semaphore for transmission processing stored in the management data storage unit 105 to a value indicating UNLOCK (step S261).

The thread 103 for data processing increments the value of the variable "counter" by 1 (step S263). The processing flow returns to the processing in step S205 of FIG. 34 via terminal U.

Figure 38:
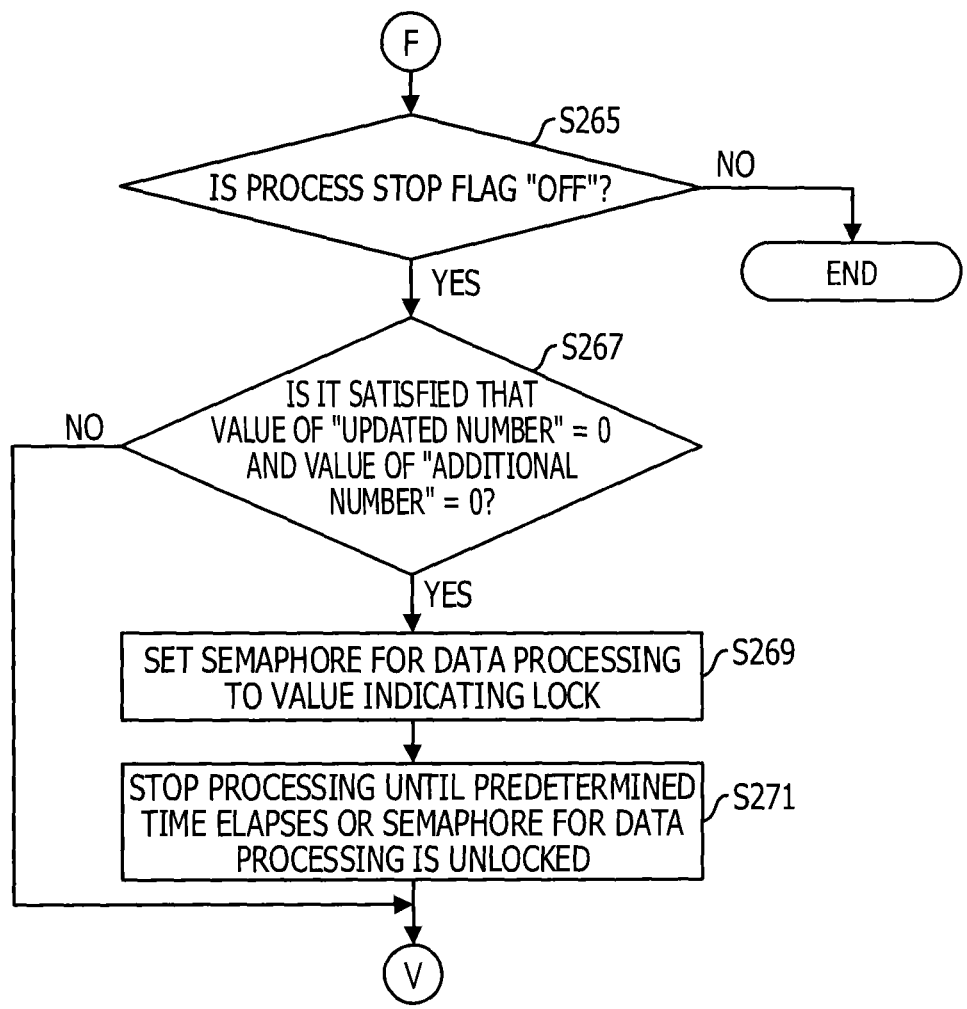

The processing after the terminal F of FIG. 38 will be described. The thread 103 for data processing determines whether the process stop flag in the management table is set to "OFF" (step S265). When the process stop flag in the management table is set to "ON" (No in step S265), a process stop command has been received and thus the data processing is terminated.

On the other hand, when the process stop flag in the management table is set to "OFF" (Yes in step S265), the thread 103 for data processing determines whether it is satisfied that the value of the variable "updated number"=0 and the value of the variable "additional number"=0 (step S267).

When it is not satisfied that the value of the variable "updated number"=0 and the value of the variable "additional number"=0 (No in step S267), the processing flow returns to step S91 of FIG. 23 via terminal V. On the other hand, when it is satisfied that the value of the variable "updated number"=0 and the value of the variable "additional number"=0 (Yes in step S267), the thread 103 for data processing sets the semaphore for data processing to a value indicating LOCK (step S269).

The thread 103 for data processing is stopped until a predetermined time (for example, 100 milliseconds) elapses or the semaphore for data processing is set to a value indicating UNLOCK (step S271).

When a predetermined time elapses or the semaphore for data processing is set to a value indicating UNLOCK, the processing flow returns to step S91 of FIG. 23 via the terminal V.

By performing the processing described above, a processing result, which is subject to integration processing, is determined according to the processing situation of the thread for transmission processing, and thus deterioration of response performance due to the integration processing may be avoided.

Because the free space size of a region storing the processing result with the last number is managed, the size of storage area used for checking the free space is reduced. In addition, the entire buffers may not checked to search for a free space, and thus standby time of the thread 104 for transmission processing for acquiring exclusive access is reduced. Furthermore, among processing results other than the first M processing results where M is the number of threads 104 for transmission processing, the processing result with the last number is subject to integration processing, and thus the integration processing is not likely to interfere with the processing of the thread 104 for transmission processing.

Next, the transmission processing performed by the thread 104 for transmission processing will be described with reference to FIGS. 39 to 42.

Figure 39:
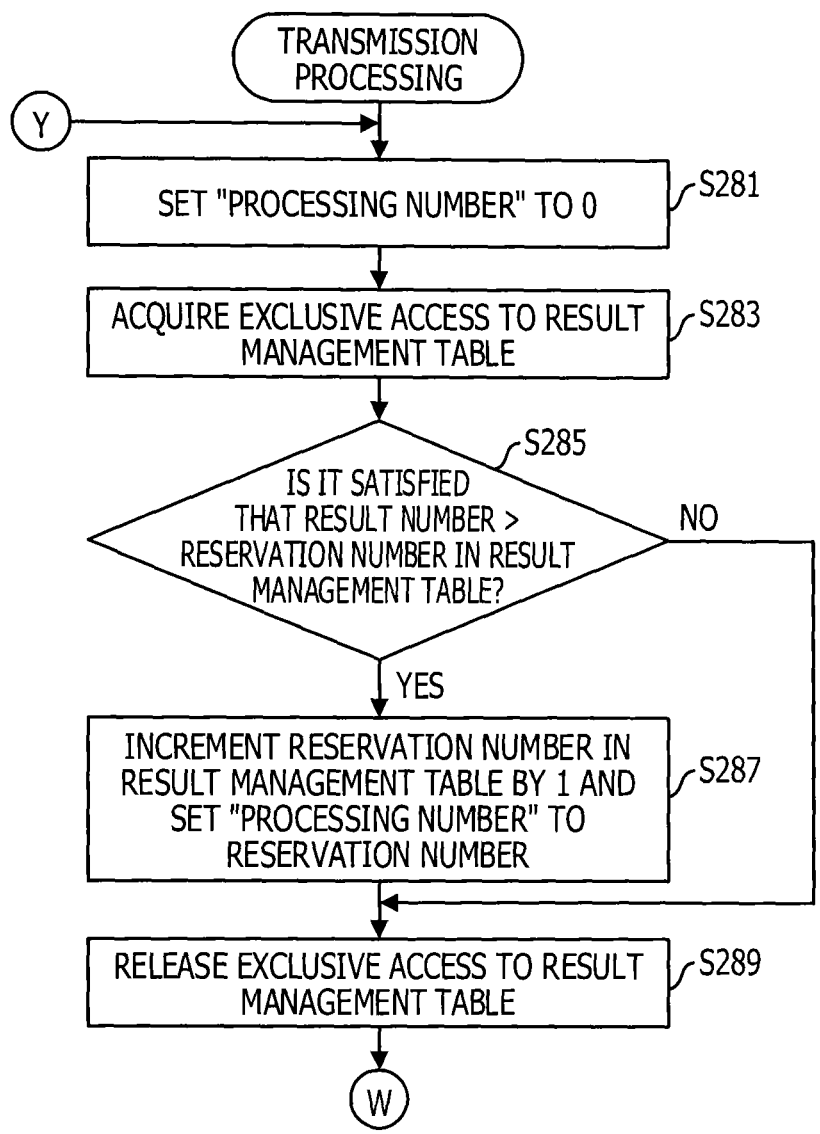
FIGS. 39 and 40 are flow charts illustrating a processing flow of transmission processing.

First, the thread 104 for transmission processing sets the variable "processing number" to 0 (step S281 in FIG. 39).

The thread 104 for transmission processing acquires exclusive access to the result management table stored in the management data storage unit 105 (step S283). The thread 104 for transmission processing then determines whether it is satisfied that the result number>the reservation number in the result management table (step S285).

When it is not satisfied that the result number>the reservation number (No in step S285), the flow proceeds to the processing in step S289. When it is satisfied that the result number>the reservation number (Yes in step S285), the thread 104 for transmission processing increments the reservation number in the result management table by 1 and sets the variable "processing number" to the reservation number (step S287).

The thread 104 for transmission processing releases the exclusive access to the result management table (step S289). The processing flow proceeds to the processing in step S291 of FIG. 40 via terminal W.

Figure 40:
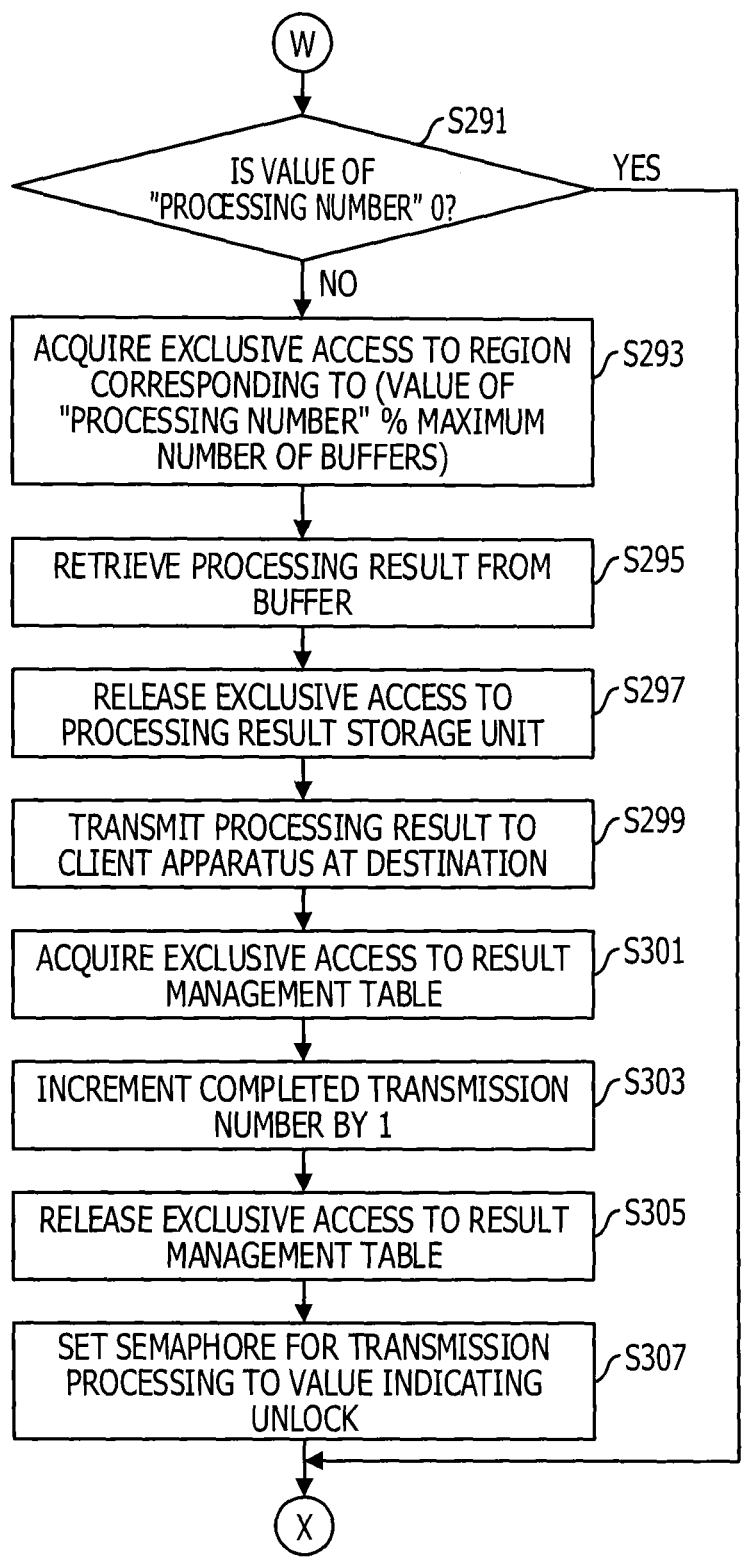

Moving on to the description of FIG. 40, the thread 104 for transmission processing determines whether the value of the variable "processing number" is 0 (step S291 in FIG. 40). When the value of the variable "processing number" is 0 (Yes in step S291), the processing flow proceeds to the processing in step S309 of FIG. 42 via terminal X.

When the value of the variable "processing number" is not 0 (No in step S291), the thread 104 for transmission processing acquires exclusive access to one of the regions corresponding to numbers 1 to N (N is the maximum number of buffers) in the processing result storage unit 107, the one region corresponding to the value calculated by (the value of the variable "processing number" % the maximum number of buffers) (step S293).

The thread 104 for transmission processing retrieves a processing result from a buffer in a region to which exclusive access has been acquired (step S295), and releases the exclusive access to the processing result storage unit 107 (step S297).

The thread 104 for transmission processing transmits the processing result retrieved in step S295 to the client apparatus at a destination (step S299).

FIG. 41 illustrates an example processing result. In the example of FIG. 41, common control data is added to a plurality of integrated processing results. The processing results include control data and a result body. The control data includes a result number, a request number, the process ID of a process that is in execution in the client apparatus, the thread ID of a thread that is in execution in the client apparatus, a session ID, a transmission time of a processing request, a transmission time of a processing result, and a value related to a state. The result body includes information on the size of the result body and results. The common control data includes the IP address of a client apparatus, the port number of a client apparatus, a client ID, the IP address of a client apparatus, and the number of processing results. The transmission time of a processing result is set, for example, when the thread 104 for transmission processing actually transmits a processing result.

The thread 104 for transmission processing acquires exclusive access to the result management table (step S301), and increments a completed transmission number by 1 (step S303). The thread 104 for transmission processing then releases the exclusive access to the result management table (step S305).

The thread 104 for transmission processing sets the semaphore for transmission processing to a value indicating UNLOCK (step S307). The processing flow proceeds to the processing in step S309 of FIG. 42 via terminal X.

Figure 42:
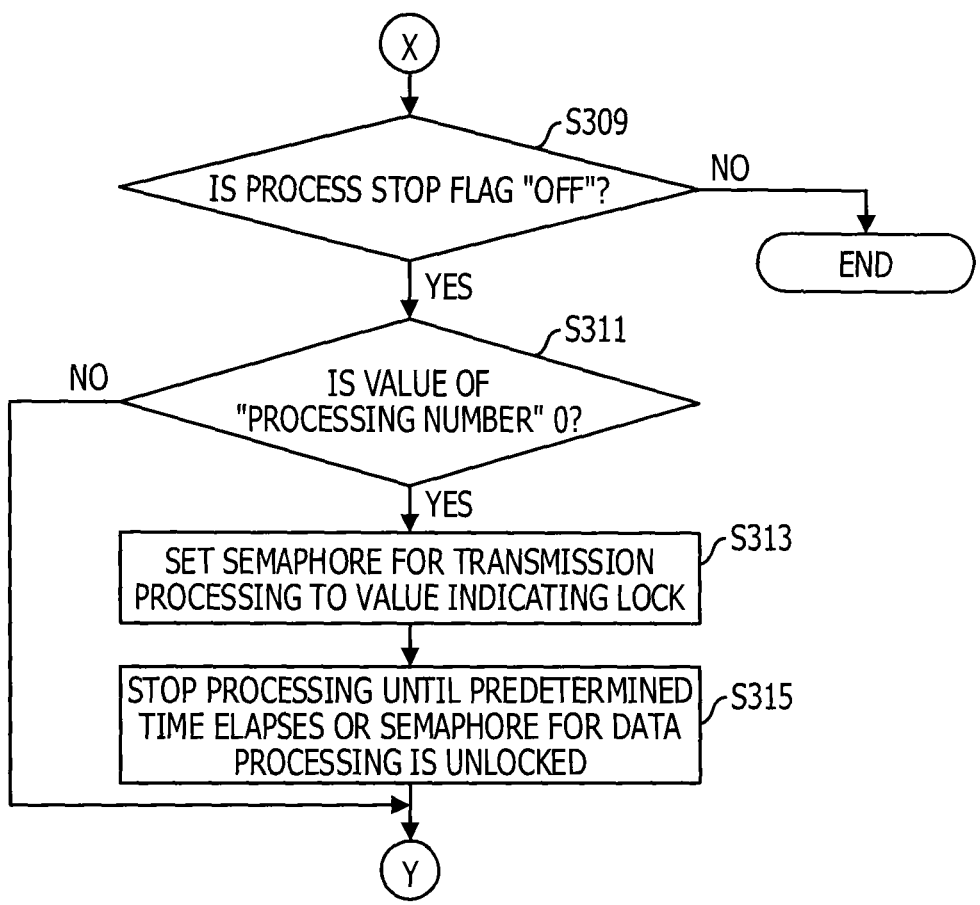
FIG. 42 illustrates a processing flow of transmission processing.

Moving on to the description of FIG. 42, the thread 104 for transmission processing determines whether the process stop flag in the management table is set to "OFF" (step S309). When the process stop flag in the management table is set to "ON" (No in step S309), a process stop command has been received and thus transmission processing is terminated.

On the other hand, when the process stop flag is set to "OFF" (Yes in step S309), the thread 103 for data processing determines whether the value of the variable "processing number" is 0 (step S311).

When the value of the variable "processing number" is not 0 (No route in step S311), the processing flow returns to the processing in step S281 of FIG. 39 via terminal Y.

On the other hand, when the value of the variable "processing number" is 0 (Yes in step S311), the thread 104 for transmission processing sets the semaphore for transmission processing to a value indicating LOCK (step S313).

The thread 104 for transmission processing is stopped until a predetermined time (for example, 100 milliseconds) elapses or the semaphore for transmission processing is set to a value indicating UNLOCK (step S315).

When a predetermined time elapses or the semaphore for transmission processing is set to a value indicating UNLOCK, the processing flow returns to the processing in step S281 of FIG. 39 via the terminal Y.

By performing the processing described above, a processing result may be sent back to the client apparatus that is the transmission source of the processing request.

Because semaphores are used in the present embodiment, a thread with a storage area in which a free space is generated is able to notify another thread of the generation of a free space in the storage area, where the other thread is to perform data storing. Therefore, a time lag is unlikely to occur between timing for having a free space in storage area and timing for storing data. If no semaphore is used, a thread, which is to perform data storing, periodically checks whether a free space is generated in the storage area. Accordingly, the time since a free space is generated in the storage area until data is actually stored is longer compared with the present embodiment.

Since the processing request storage unit 106 and the processing result storage unit 107 are divided into N parts, the region subject to integration processing may be decreased to a minimum. Therefore, delay in processing of a thread due to exclusive control is reduced.

Furthermore, the total data volume of a plurality of processing results having the same destination is not more than the data volume transmittable by the thread 104 for transmission processing at a time, and thus the thread 104 for transmission processing may perform transmission processing efficiently.

Because the processing performed by the servers 11 and 12 is the same as the processing performed by the server 10, a description thereof is omitted.

Next, the processing performed by the client apparatus 30 will be described with reference to FIGS. 43 to 46.

Figure 43:
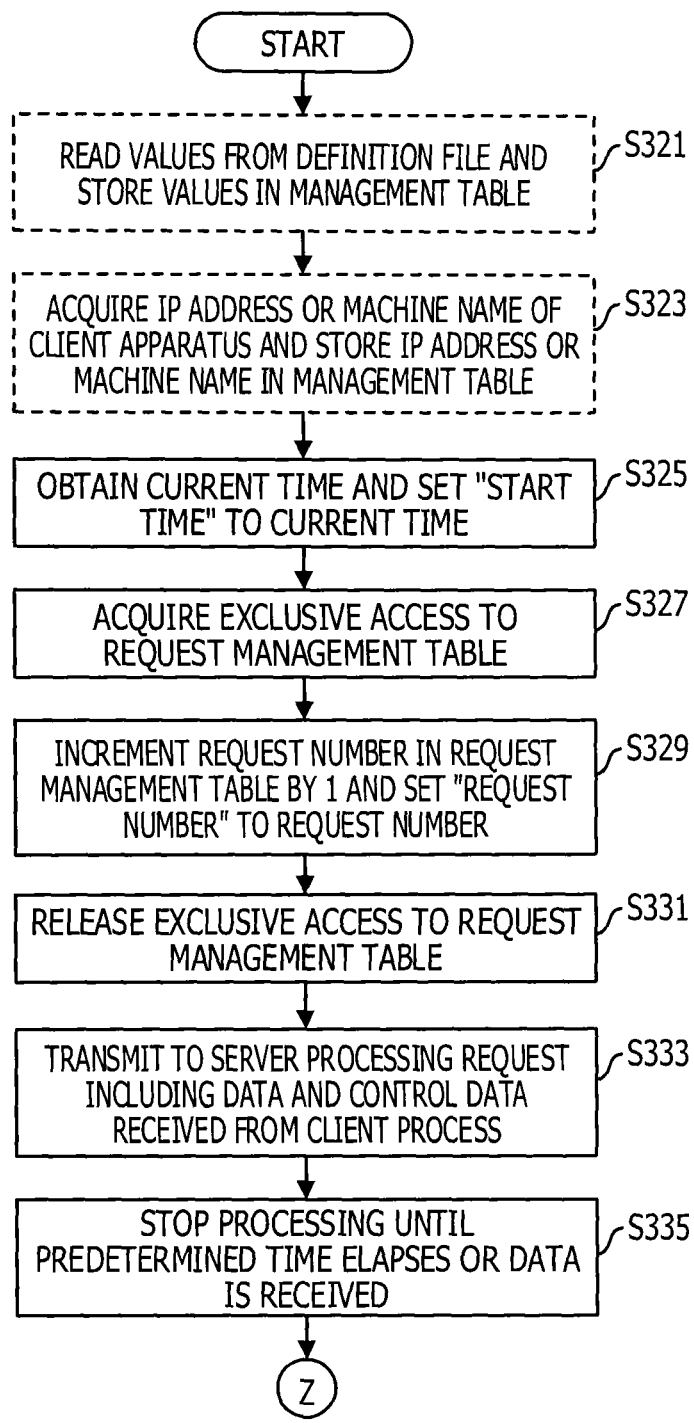
FIG. 43 illustrates a processing flow of processing performed by the client apparatus.

First, the management unit 301 of the client apparatus 30 reads the values of parameters from the definition file storage unit 303, and stores the values of parameters in a management table stored in the management data storage unit 304 (step S321 in FIG. 43).

The management unit 301 acquires the IP address or machine name of the client apparatus 30, and stores the IP address or machine name in the management table stored in the management data storage unit 304 (step S323).

Because steps S321 and S323 are processing to be performed only the first time, the block for each of steps S321 and S323 is indicated by a dotted line.

FIG. 44 illustrates an example data stored in the management table of the client apparatus 30. In the example of FIG. 44, there are stored a client ID, the IP address of the server at a transmission destination, the port number of the server at the transmission destination, the time of client timeout, the IP address of the client apparatus 30, and the port number used in the client apparatus 30. It is to be noted that a host name may be stored instead of the IP address.

Returning to the description of FIG. 43, the management unit 301 obtains the current time from a system clock as an example, and sets variable "start time" to the current time (step S325).

The management unit 301 acquires exclusive access to the request management table stored in the management data storage unit 304 (step S327). FIG. 45 illustrates an example data stored in the request management table of the client apparatus 30. In the example of FIG. 45, the request management table stores exclusion information and a request number.

The management unit 301 increments the request number in the request management table by 1 and sets the variable "request number" to the request number (step S329).

The management unit 301 releases the exclusive access to the request management table (step S331).

The management unit 301 generates a processing request including the request body and control data received from the client process 302, and transmits the processing request to the destination server (step S333). The control data includes the client ID defined in the management table, the machine name or IP address of a server, the port number of a server, the machine name or IP address of the client apparatus 30, the port number used in the client apparatus 30, and variable "request number". The processing request is as illustrated in FIG. 17.

The management unit 301 is stopped until a predetermined time (for example, $\frac{1}{10}$ of the time of client time-out) elapses or data is received (step S335). When a predetermined time elapses or data is received, the processing flow proceeds to step S337 of FIG. 46 via terminal Z.

Figure 46:
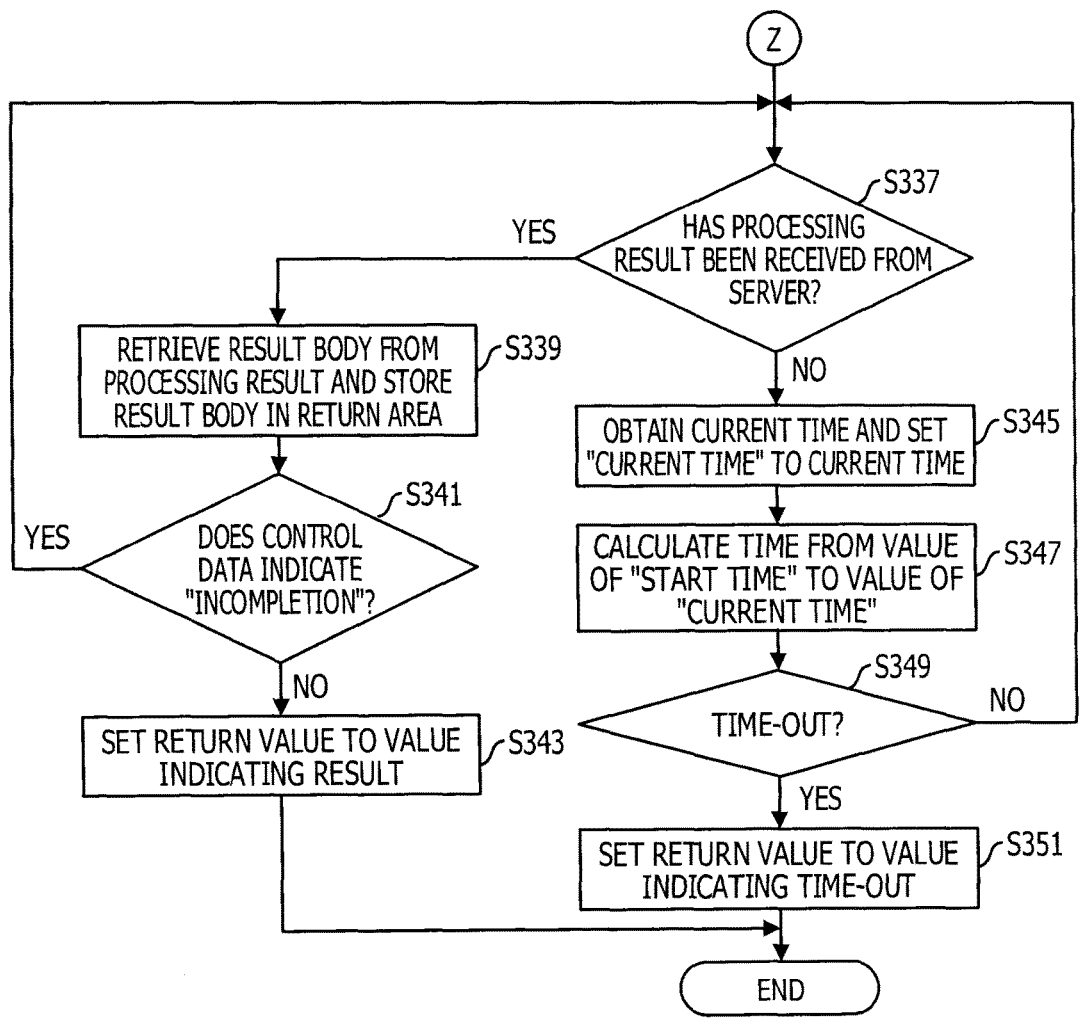
FIG. 46 illustrates a processing flow of processing performed by the client apparatus.

Moving on to the description of FIG. 46, the management unit 301 determines whether the received data is a processing result from the destination server on the processing request (step S337 in FIG. 46). When the received data is a processing result (Yes in step S337), the management unit 301 retrieves a result body from the processing result and stores the result body additionally in a return area (step S339). The return area is an area for passing data to the client process 302.

The management unit 301 determines whether the control data included in the processing result indicates "incompletion" (step S341). The control data included in the processing result includes a value indicating either "incompletion" or "completion". When the control data included in the processing result indicates "incompletion" (Yes in step S341), a processing result follows, and thus the flow returns to the processing in step S337.

When the control data included in the processing result indicates "completion" (No in step S341), no processing result follows, and thus the management unit 301 sets a return value to a value indicating the result indicated by the body (step S343). The flow then returns to the client process 302 and processing is terminated.

On the other hand, when the received data is not a processing result (No in step S337), the management unit 301 obtains the current time from a system clock as an example, and sets the variable "current time" to the current time (step S345).

The management unit 301 calculates the time from the value of the variable "start time" to the value of the variable "current time" (step S347).

The management unit 301 determines whether time-out has occurred (step S349). In step S349, it is determined whether the time calculated in step S347 is longer than the client time-out in the management table. When time-out has not occurred (No in step S349), the flow returns to the processing in step S337.

On the other hand, when time-out has occurred (Yes in step S349), the management unit 301 sets the return value to a value indicating time-out (step S351). The flow then returns to the client process 302 and the processing is terminated.

By performing the processing described above, even when the processing result is divided into multiple sub-results to be received, the result body may be properly passed to the client process 302.

Because the processing performed by the client apparatus 31 is the same as the processing performed by the client apparatus 30, a description thereof is omitted.

Although an embodiment has been described above, the embodiment is not limited to this. For example, the above-described functional block configuration of the server 10 and the client apparatus 30 may not match actual program module configuration.

The data holding configuration explained above is an example and may not be the configuration as described above. In addition, also in the processing flow, the order of processing may be changed as long as the processing result remains the same. Furthermore, the processing may be performed in parallel.

It is to be noted that when a processing request is a coupling request, a client ID may be dynamically generated or statically generated based on the value of parameter "MaxClientID" in the definition file.

Also, in order to accelerate identification of the last number and the free space size from a client ID, a hash table or a B-Tree may be utilized in which a client ID serves as a key and the last number and the free space size are values to be taken.

Also, information on time is pre-stored in the management table and may be used as the above-mentioned predetermined times.

Figure 47:
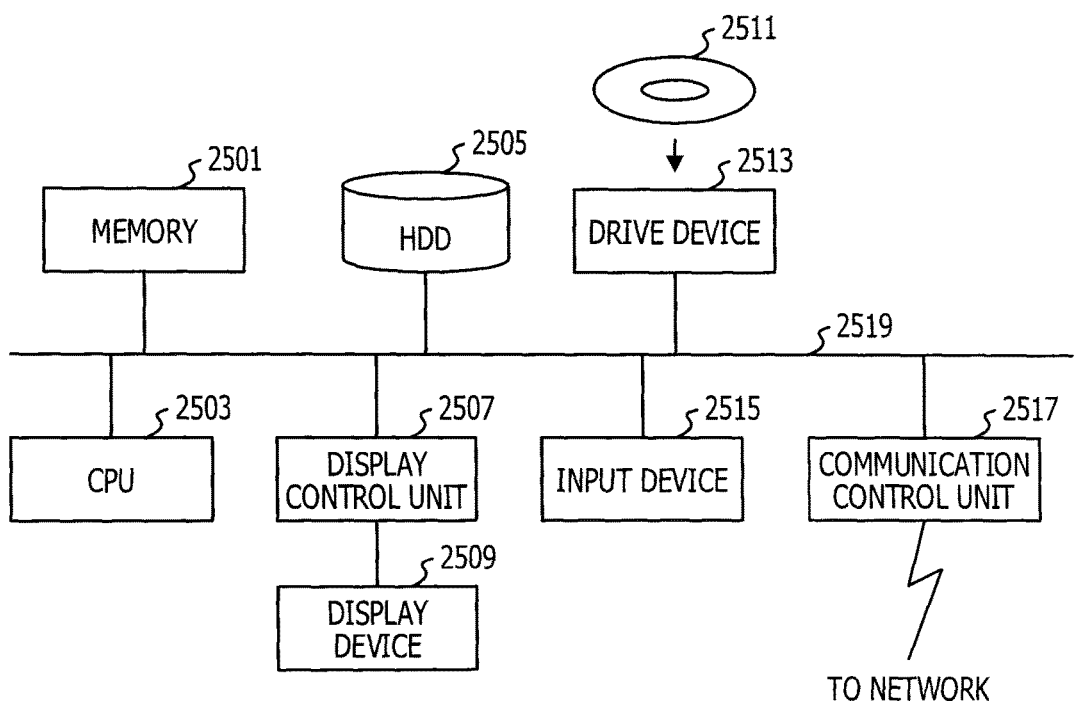
FIG. 47 is a functional block diagram of a computer.

The servers 10 to 12 and the client apparatuses 30 and 31 described above are each a computer machine, and as illustrated in FIG. 47, a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 to be coupled to a network are coupled via a bus 2519. Application programs for executing an operating system (OS) and the processing in the present embodiment are stored in the HDD 2505 and are loaded from the HDD 2505 to the memory 2501 when executed by the CPU 2503. The CPU 2503 controls the display control unit 2507, the communication control unit 2517, and the drive device 2513 according to the content of processing of an application program to perform a predetermined operation. Also, data during processing is mainly stored in the memory 2501. The data, however, may be stored in the HDD 2505. In the present embodiment, the application programs for executing the above-described processing are stored in the computer-readable removable disk 2511 to be distributed and are installed in the HDD 2 505 from the drive device 2513. It is to be noted that the application programs may be installed in the HDD 2505 via a network such as the Internet and the communication control unit 2517. Such a computer machine achieves the above-mentioned various functions by organic cooperation between hardware such as the CPU 2503 and the memory 2501 and programs such as an OS and an application program described above.

The summary of the above-described present embodiment may be as follows.

The information processing apparatus according to the first embodiment includes: (A) a buffer that stores one or a plurality of messages to be transmitted; (B) one or a plurality of communication units that retrieves a message from the buffer and each performs transmission processing on the retrieved message; and (C) an execution unit that identifies messages which are out of the messages stored in the buffer and which are subject to integration processing in which two or more messages having the same destination are integrated and that performs the integration processing on the identified messages based on a result of comparison between the number of the messages stored in the buffer and the number of the communication units.

In this manner, messages subject to integration processing may be identified according to the processing situation of the communication units, and thus deterioration of transmission performance due to the integration processing on the messages may be avoided.

In addition, the above-described execution unit (c1) determines whether the number of the messages stored in the one or more buffers is greater than the number of the communication units, and (c2) when the number of the messages stored in the one or more buffers is greater than the number of the communication units, excludes a certain number of messages out of the messages stored in the one or more buffers from being subject to the integration processing, the certain number being equal to the number of the communication units. The messages excluded from being subject to the integration processing may be those messages which are out of the messages stored in the one or more buffers and which are retrieved from the one or more buffers earlier than the messages subject to the integration processing. In this manner, the integration processing may be performed on messages that are not likely to be immediately transmitted.

Also, when the number of the messages stored in the one or more buffers is not greater than the number of the communication units, the above-described execution unit (c3) may exclude the messages stored in the one or more buffers from being subject to the integration processing. In this manner, messages that are likely to be immediately transmitted may be excluded from being subject to the integration processing.

Also, some of the buffers described above may have a plurality of regions. The above-described execution unit (c4) may divide the messages stored in the one or more buffers into a plurality of regions such that two or more messages having different destinations are not stored in one region. In this manner, integration of messages in the one or more buffers may be performed properly.

In addition, the present information processing apparatus may further include a management data storage unit that (D) stores information for identifying a region which stores a message to be transmitted to a destination and information on the free space of the region, both information being associated with identification information on the destination. The above-described execution unit (c5) may use the management data storage unit to determine whether the data volume of a newly generated first message is greater than the free space of a first region that stores a second message to be transmitted to the destination of the first message, and (c6) when the data volume of the first message is not greater than the free space of the first region and the second message is subject to the integration processing, the first message and the second message may be integrated. In this manner, even when the capacity of a region has an upper limit, integration of messages may be performed properly.

The above-described execution unit, (c7) when the data volume of the first message is greater than the free space of the first region and the second message is subject to the integration processing, may store part of the first message in the first region and (c8) may store the rest of the first message in a second region that is one of a plurality of regions and stores no message. In this manner, even when the upper limit of the capacity of a region is reached, messages may be processed properly.

Also, (d1) the information stored in the management data storage unit for identifying a region which stores a message to be transmitted to a destination may be information for identifying a region which stores a message that is one of the messages to be transmitted to the destination and is stored in the one or more buffers most recently. In this manner, processing may be accelerated. Also, the amount of information to be managed may be reduced.

Also, the total data volume of one or more messages stored in each of the regions may be less than or equal to the data volume transmittable at a time by each of the communication units. In this manner, transmission may be efficiently performed by each communication unit.

The above-described execution unit (c9) may provide information in the part of the first message stored in the first region, the information indicating presence of subsequent portion of the first message, and may provide information in the rest of the first message stored in the second region, the information indicating the last portion of the first message. In this manner, an apparatus, which receives a message, is able to extract information properly from the message.

A communication control method according to the second embodiment includes: (E) comparison processing to compare the number of messages to be transmitted with the number of one or a plurality of communication units that retrieves a message from a buffer which stores the messages to be transmitted and each performs transmission processing on the retrieved message; identifying messages, based on a result of the comparison, which are out of the messages stored in the buffer and which are subject to integration processing in which two or more messages having the same destination are integrated; and processing to perform integration processing on the identified messages.

It is possible to create a program that causes a computer to execute the processing in the above-described method. The program is stored, for example, in a computer-readable storage medium or a storage device such as a flexible disk, a CD-ROM, a magneto-optical disk, a semiconductor memory, and a hard disk. It is to be noted that intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control method comprising:
    comparing a number of messages to be transmitted which are stored in a buffer with a number of communication processings in execution, each of the communication processings being to execute processing to transmit the messages stored in the buffer;
    when a result of the comparing indicates that the number of the messages stored in the buffer is greater than the number of communication processings, identifying a first message subject to an integration process by excluding a certain number of messages from the messages stored in the buffer, the certain number being equal to the number of communication processings; and
    determining, by a processor, whether the integration processing is performed on the first message and a newly generated second first message to be transmitted, the integration processing being processing that integrates the second message and the first message which is in the buffer and a destination of the first message is the same as a destination of the second message.

2. The communication control method according to claim 1, wherein the messages excluded from being subject to the integration processing are, among the messages stored in the buffer, messages to be transmitted earlier than the first message subject to the integration processing.

3. The communication control method according to claim 1, wherein determining determines that the integration processing is not performed when the result of the comparing indicates that the number of the messages stored in the buffer is not greater than the number of communication processings.

4. The communication control method according to claim 1, wherein the buffer has a plurality of regions,
    the method further comprising:
        selecting a region for storing each of the messages from the plurality of regions such that two or more messages having different destinations are not stored in the same region among the regions.

5. The communication control method according to claim 4, wherein when it is determined by the determining that the integration processing is performed, the first message of which the same destination as the destination of the second message is specified, and which is stored in a first region having a free space greater than data volume of the second message among the regions, is selected to subject to the integration processing.

6. The communication control method according to claim 4, wherein when it is determined by the determining that the integration processing is performed, based on a free space of a first region in the regions, in which the first message subject to the integration processing is stored, the integration processing stores a first portion of the second message in the first region, and stores a second portion of the second message, other than the first portion, in a second region in the regions, other than the first region.

7. The communication control method according to claim 6, wherein the second region is a region which stores no message among the regions.

8. The communication control method according to claim 6, further comprising:
    setting, in the first region, information indicating presence of subsequent portion; and setting, in the second region, information indicating a last portion.

9. The communication control method according to claim 4, wherein a region which stores one of the messages is a region that stores a precedence message of which the same destination as a destination of the one message is specified and which is stored in the buffer most recently among the messages.

10. The communication control method according to claim 4, wherein a total data volume of one or more messages stored in each of the regions is less than or equal to a data volume transmittable at a time by each of the communication processings.

11. An information processing apparatus comprising:
a buffer; and
a processor coupled to the buffer and configured to:
compare a number of messages to be transmitted which are stored in the buffer with a number of communication processings in execution, each of the communication processings being to execute processing to transmit the messages stored in the buffer,
when result of the comparing indicates that the number of the messages stored in the buffer is greater than the number of the communication processings, identify a first message subject to an integration processing by excluding a certain number of messages from the messages stored in the buffer, the certain number being equal to the number of the communication processings, and
determine whether the integration processing is performed on the first message and a newly generated second message to be transmitted, the integration processing being processing that integrates the second message and the first message which is in the buffer and a destination of the first message is the same as a destination of the second message.

12. The information processing apparatus according to claim 11, wherein the messages excluded from being subject to the integration processing are, among the messages stored in the buffer, messages to be transmitted earlier than the first message subject to the integration processing.

13. The information processing apparatus according to claim 11, wherein the processor is configured to determine that the integration processing is not performed when the result of the comparing indicates that the number of the messages stored in the buffer is not greater than the number of communication processings.

14. The information processing apparatus according to claim 11, wherein the processor is configured to select a region for storing each of the messages from the plurality of regions such that two or more messages having different destinations are not stored in the same region among the regions.

15. The information processing apparatus according to claim 14, wherein the processor is configured to:
when it is determined that the integration processing is performed, the first message of which the same destination as the destination of the second message is specified, and which is stored in a first region having a free space greater than data volume of the second message among the regions, select to subject to the integration processing.

16. The information processing apparatus according to claim 14, wherein
when it is determined that the integration processing is performed, based on a free space of a first region in the regions, in which the first message subject to the integration processing is stored, the integration processing stores a first portion of the second message in the first region, and stores a second portion of the second message, other than the first portion, in a second region in the regions, other than the first region.

17. The information processing apparatus according to claim 14, wherein a region which stores one of the messages is a region that stores a precedence message of which the same destination as a destination of the one message is specified and which is stored in the buffer most recently among the messages.

18. A non-transitory computer-readable storage medium that stores computer-readable instructions that, when executed by a computer, cause the computer to execute a process, comprising:
comparing a number of messages to be transmitted which are stored in a buffer with a number of communication processings in execution, each of the communication processings being to execute processing to transmit the messages stored in the buffer;
when result of the comparing indicates that the number of the messages stored in the buffer is greater than the number of the communication processings, identifying a first message subject to an integration processing by excluding a certain number of messages from the messages stored in the buffer, the certain number being equal to the number of the communication processings; and
determining whether the integration processing is performed on the first message and a newly generated second message to be transmitted, the integration processing being processing that integrates the second message and the first message which is in the buffer and a destination of the first message is the same as a destination of the second message.

* * * * *